(12) United States Patent
Gerde et al.

(10) Patent No.: US 8,584,029 B1
(45) Date of Patent: Nov. 12, 2013

(54) SURFACE COMPUTER SYSTEM AND METHOD FOR INTEGRATING DISPLAY OF USER INTERFACE WITH PHYSICAL OBJECTS

(75) Inventors: Matthew E. Gerde, The Colony, TX (US); Jeffrey M. Wolfe, Parrish, FL (US); Michael J. Rainwater, Frisco, TX (US)

(73) Assignee: Intuit Inc., Mountain View, CA (US)

( * ) Notice: Subject to any disclaimer, the term of this patent is extended or adjusted under 35 U.S.C. 154(b) by 1337 days.

(21) Appl. No.: 12/126,382

(22) Filed: May 23, 2008

(51) Int. Cl.
*G06F 3/00* (2006.01)

(52) U.S. Cl.
USPC .......................................... 715/771; 715/831

(58) Field of Classification Search
USPC ................... 715/771, 765, 702, 831; 359/17; 358/401, 408, 474, 486, 488, 496–498
See application file for complete search history.

(56) References Cited

U.S. PATENT DOCUMENTS

| | | | |
|---|---|---|---|
| 6,631,457 B1 | 10/2003 | Ohba | |
| 7,224,820 B2 * | 5/2007 | Inomata et al. | 382/100 |
| 7,236,162 B2 | 6/2007 | Morrison et al. | |
| 7,297,058 B2 | 11/2007 | Gomez et al. | |
| 7,358,962 B2 | 4/2008 | Dehlin et al. | |
| 2003/0011633 A1 * | 1/2003 | Conley et al. | 345/762 |
| 2003/0044043 A1 * | 3/2003 | Kaneda | 382/100 |
| 2004/0022411 A1 * | 2/2004 | Tamaru et al. | 382/100 |
| 2004/0205631 A1 * | 10/2004 | Keohane et al. | 715/526 |
| 2005/0227217 A1 | 10/2005 | Wilson | |
| 2005/0240871 A1 | 10/2005 | Wilson | |
| 2005/0247791 A1 * | 11/2005 | Sado et al. | 235/472.01 |
| 2006/0007123 A1 | 1/2006 | Wilson et al. | |
| 2006/0010400 A1 | 1/2006 | Dehlin et al. | |
| 2006/0092170 A1 | 5/2006 | Bathiche et al. | |
| 2006/0214907 A1 | 9/2006 | Devos et al. | |
| 2006/0277482 A1 * | 12/2006 | Hoffman et al. | 715/764 |
| 2006/0282778 A1 * | 12/2006 | Barsness et al. | 715/726 |
| 2006/0288416 A1 * | 12/2006 | Costea et al. | 726/24 |
| 2007/0112819 A1 * | 5/2007 | Dettinger et al. | 707/101 |
| 2007/0157095 A1 | 7/2007 | Bilow et al. | |
| 2007/0204164 A1 * | 8/2007 | Cattrone et al. | 713/176 |
| 2007/0220614 A1 * | 9/2007 | Ellis et al. | 726/27 |
| 2007/0237427 A1 * | 10/2007 | Patel et al. | 382/305 |
| 2007/0260675 A1 | 11/2007 | Forlines et al. | |
| 2008/0080009 A1 * | 4/2008 | Masui et al. | 358/3.28 |
| 2008/0080022 A1 * | 4/2008 | Gogulapati | 358/487 |

(Continued)

OTHER PUBLICATIONS

U.S. Appl. No. 12/052,423, filed Mar. 30, 2008.

(Continued)

*Primary Examiner* — Steven Sax
(74) *Attorney, Agent, or Firm* — Osha Liang LLP

(57) ABSTRACT

Systems and methods for assisting user interaction with physical objects. A system may include an interactive display surface configured to display visual output and receive a physical object, where the object possesses encoded data including data other than data directly identifying the object. The system may include a computer-readable storage medium storing program instructions executable by the surface computer to implement software applications. In response to the display surface receiving the object, the surface computer may be configured to read the encoded data passively with respect to the object, without using an active electronic interface between the surface computer and the object, and to display a user interface for software applications dependent upon the passively read encoded data, such that one or more elements of the user interface are visually associated on the interactive display surface with the physical object.

36 Claims, 8 Drawing Sheets

(56) References Cited

U.S. PATENT DOCUMENTS

| | | | | |
|---|---|---|---|---|
| 2008/0189608 | A1* | 8/2008 | Nurmi | 715/273 |
| 2008/0279348 | A1* | 11/2008 | Carro | 379/88.04 |
| 2009/0049375 | A1* | 2/2009 | Aughenbaugh et al. | 715/253 |
| 2009/0180136 | A1* | 7/2009 | Teranishi | 358/1.15 |
| 2009/0210786 | A1* | 8/2009 | Suzuki | 715/243 |
| 2009/0235187 | A1* | 9/2009 | Kim et al. | 715/760 |
| 2010/0119067 | A1* | 5/2010 | Yoshio et al. | 380/243 |

OTHER PUBLICATIONS

"Microsoft Surface, Future of Computers," blog.800HighTech.com, blog.800hightech.com/microsoft-surface-future-of-computers/512/, Jun. 5, 2007, 8 pages.

"First Look: Microsoft Milan Surface Computer—A Table That Knows What's On It," Wired, blog.wired.com/gadgets/2007/05/first_look_micr.html, May 29, 2007, 5 pages.

"What is Microsoft Surface?," ProgrammerWorld.NET, faq.programmerworld.net/cool-gadgets/what-is-microsoft-surface.html, 3 pages, 2008.

"Microsoft Surface: My Dream Interactive Table," Kiwipulse, www.kiwipulse.com/microsoft-surface-my-dream-interactive-table, Apr. 3, 2008, 15 pages.

"ROSIE Coffee Table is Apple Surface," Gizmodo, gizmodo.com/gadgets/savant/rosie-coffee-table-is-apple-surface-296534.php, Sep. 5, 2007, 5 pages.

"Hands On the Rosie Apple-Powered Multitouch Table," Gizmodo, gizmode.com/gadgets/apple/hands-on-the-roise-apple+powered-multitouch-table-verdict-meh-297282.php, Sep. 6, 2007, 8 pages.

"Crave TV: Hitachi StarBoard interactive surface," CNET.co.uk, crave.cnet.co.uk/video/0,139101587,49295106,00.htm, Jan. 16, 2008, 5 pages.

"Surface computer," Wikipedia, en.wikipedia.org/wiki/Surface_computer, 1 page, Oct. 8, 2007.

"Patent Problems with Multitouch," SurfaceRama.com, www.surfacerama.com/2008/03/26/patent-problem-with-mutitouch, Mar. 26, 2008, 4 pages.

"Multi-touch possibilities," BillDay.com, billday.com/2007/03/02/multi-touch-possibilities, Mar. 2, 2007, 4 pages.

Home page, Perceptive Pixel, perceptivepixel.com, 2007, 1 page.

"Microsoft Surface: Behind-the-Scenes First Look," Popular Mechanics, www.popularmechanics.com/technology/industry/4217348.html, Jul. 2007, 5 pages.

Home page, Microsoft Surface, www.microsoft.com/surface/index.html, 1 page, 2008.

"Tales from the Microsoft Surface Team: Surface launches at AT&T stores," blogs.msdn.com/surface/archive/2008/04/19/surface-launches-at-at-t.aspx, Apr. 19, 2008, 4 pages.

* cited by examiner

SURFACE COMPUTER SYSTEM AND METHOD FOR INTEGRATING DISPLAY OF USER INTERFACE WITH PHYSICAL OBJECTS

BACKGROUND

Description of the Related Art

As computing technology for business and personal use continues to proliferate, many modes of generating and manipulating information have shifted to the purely digital realm. For example, with the advent of electronic commerce, "paperless" transactions, in which every aspect of the transaction may take place through electronic exchanges of information, have become commonplace. Despite this trend, physical documents are still very much in use as sources of information in various contexts. As a result, a significant amount of electronic information may originate from and/or may need to be validated against physical (i.e., non-electronic) documents.

Interfacing electronic information with physical documents presents a variety of challenges, such as that of converting human-readable content into a form suitable for electronic processing. This process is often conducted through manual data entry or automated techniques such as optical character recognition. However, even the best available techniques present the possibility of introducing errors in the course of data conversion. For example, in manual data entry, a data item from a physical document may be miskeyed, while in automated techniques, such a data item may be incorrectly recognized.

Additionally, the management of information that occurs in both electronic form and in physical document form may present challenges. For example, users who are familiar with a physical document may be unfamiliar with how its data relates to a particular electronic application that uses the data. Conversely, users familiar with an electronic application may not be able to quickly locate relevant portions of related documents. These types of gaps may hamper the productivity of users who need to interact with information that is distributed across the physical and electronic domains.

As the number and variety of electronic applications available for processing data in the physical arena increases, so do the demands upon users both to be aware of which applications may apply to a particular physical realm, and to know how to operate interfaces for those applications. These concerns extend well beyond the sphere of paper documents, encompassing other physical objects as well.

SUMMARY

Various embodiments of systems and methods for facilitating user interaction with physical documents are disclosed. In one embodiment, a system may include a physical document interface configured to receive a physical document having a surface including document data items, such that at least a portion of the surface of the physical document is visible to a user. The system may further include a device including a computer-readable storage medium storing program instructions executable by the device to implement an application. The application may be executable to display a user interface including application data items, each of which may be selectable via the user interface. In response to the selection of a given application data item via the user interface, the device may be configured to cause the physical document interface to visibly indicate a location on the surface of the physical document, where the visibly indicated location includes a document data item corresponding to the application data item selected via the user interface.

In one embodiment, a method may include a physical document interface receiving a physical document, such that at least a portion of a data surface of the physical document is visible to a user. In response to the user selecting a given data item displayed by an application, the method may further include the physical document interface visibly indicating a corresponding area within the physical document to the user.

Further embodiments of systems and methods for assisting user interaction with physical objects are disclosed. In one embodiment, a system may include a surface computer including an interactive display surface configured to display visual output and to receive a physical object, where the physical object possesses encoded data including data other than data directly identifying the physical object. The system may include a computer-readable storage medium storing program instructions executable by the surface computer to implement software applications. In response to the interactive display surface receiving the physical object, the surface computer may be configured to read the encoded data passively with respect to the physical object, without using an active electronic interface between the surface computer and the physical object. The surface computer may be further configured to display a user interface for at least one of the software applications dependent upon the passively read encoded data, such that one or more elements of the user interface are visually associated on the interactive display surface with a portion of the encoded data located on the physical object.

Figure 1:
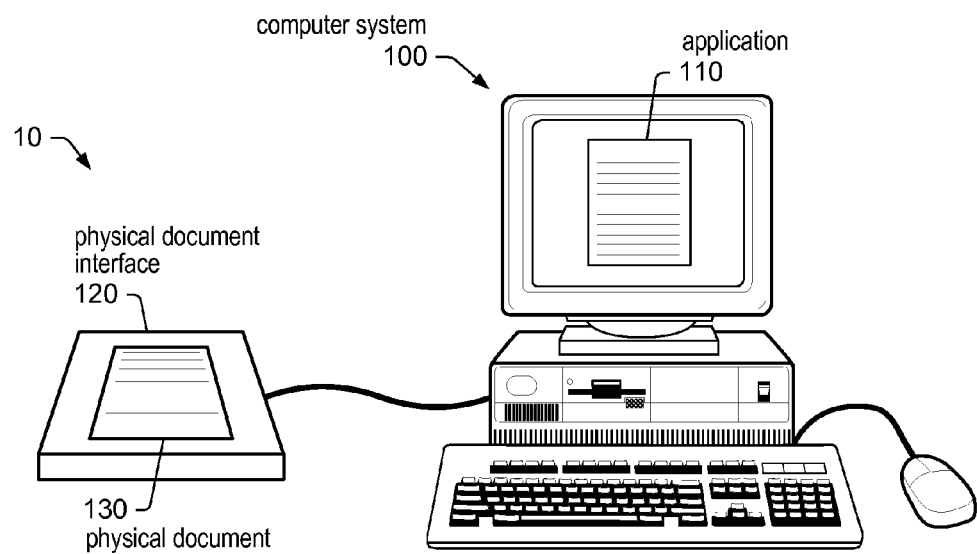
FIG. 1 is a block diagram illustrating one embodiment of an interactive document system.

While the present disclosure is described herein by way of example for several embodiments and illustrative drawings, those skilled in the art will recognize that the disclosure is not limited to the embodiments or drawings described. It should be understood, that the drawings and detailed description thereto are not intended to limit the claims to the particular form disclosed, but on the contrary, the intention is to cover all modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

As noted above, the use of computing technology for storage and processing of more and more types of content via computer systems and network-accessible resources is increasing the necessity for accurate data entry and processing, and for mutual verification and cross-checking of related documents and applications. With the proliferation of types of content and processing capability, and the growing consonant complexity of relevant computing systems, there is a need for methods to ease the burdens of operating such complex systems, and to mitigate the amount of human effort expended in the entry, processing, and verification of data. For example, the entry and processing of data from physical documents, and subsequent comparison of their electronic representations within computer applications can be very laborious for humans. Additionally, understanding the relationships between myriad computer applications and related physical documents can require considerable expenditure of human effort, especially as the variety and complexity of such applications and associated documents increases. Automated computer assistance in aiding such understanding, and in easing the human effort required for the entry and processing of data is sorely needed. The increasing power and sophistication of both hardware and software affords an opportunity to harness their potential to relieve the burden of operation for humans.

In the following discussion, various embodiments of systems and techniques for facilitating user interaction with physical documents are explored. In particular, a physical document interface configured to facilitate such user interaction is described in detail. By using such an interface, for example in conjunction with a computer-based application that uses data derived from physical documents, a user may more readily identify data discrepancies that may arise from a data entry or data conversion process, or may more easily understand how a document and an application relate to one another.

First, a general overview of an interactive document system is provided. Then, various techniques through which such a system may be employed to perform interactive document management functions are discussed. Next, a system for interfacing with objects using a surface computer is portrayed, along with several illustrative embodiments demonstrating interaction between objects and the surface computer. Finally, an exemplary computer system embodiment that may be employed to implement aspects of the interactive systems is described.

Interactive Document System

One embodiment of an interactive document system is illustrated in FIG. 1. In the illustrated embodiment, interactive document system 10 (or simply, system 10) includes a computer system 100 that is configured to execute an application 110. Computer system 100 is configured to communicate with a physical document interface 120 that is configured to receive a physical document 130.

Generally speaking, computer system 100 may correspond to any suitable type of computer system configured to execute applications. For example, computer system 100 may correspond to a desktop computer system, a laptop or notebook computer, a handheld computing device such as a personal digital assistant, cellular phone, media player, or combination device, or any other suitable type of device. In various embodiments, computer system 100 may include a microprocessing system, storage capacity, input and output systems, and/or networking capability. Storage capacity may be implemented remotely or locally, and may include internal storage or removable media devices. Internal storage may be implemented, for example, using memory, such as random access memory (RAM), mass storage devices such as hard disks, solid-state drives, disk array controllers, or other suitable means. Removable storage media devices may include, for example, compact disc systems, DVD systems, Blu-ray systems, floppy disk drives, Zip drives, USB flash drives, tape drives, or other types of devices. Input systems may include a keyboard, mouse, trackball, joystick, or similar device. They may also include an image scanner or web cam for image or video input. Output systems may variously include a video subsystem including a video monitor or other display device, an audio subsystem, or other types of output devices. In some embodiments, computer system 100 may be configured to execute one or more operating systems, such as Microsoft Windows™, Apple MacOS™, Linux™, or any other suitable operating systems. One exemplary embodiment of computer system 100 is discussed in greater detail below in conjunction with the description of FIG. 8.

In various embodiments, application 110 may be configured to perform any of a wide variety of tasks. Application 110 may be configured to display or edit text. Exemplary applications of this type are Microsoft Notepad, SimpleText, AbiWord, Emacs, and Microsoft Word, among many others. Application 110 may be configured to work with various structured data or forms, such as tax forms, medical forms, insurance forms, lottery forms, shipping forms, order forms, tickets, voting ballots, or any of a variety of other such forms, or templates. Exemplary applications 110 may include web browsers, tax preparation software, accounting software, spreadsheet software, and many other systems for managing structured data or forms. In some embodiments, application 110 may be configured to work with other types of data, instead of or in addition to form-based data, such as graphical or audio data, for example. In various embodiments, application 110 may be configured to perform any suitable function to process, analyze, or transform data obtained from input sources (e.g., forms, files, or other sources), and/or may facilitate the creation of new data. For example, a tax application may be configured to analyze input financial data in order to determine tax liability, identify tax strategies, and the like.

In various embodiments, application 110 may be implemented via computer-executable program instructions stored by a computer-readable medium, as described in greater detail below in conjunction with the description of FIG. 8. In some embodiments, application 110 may be executable to display a user interface through which a user of application 110 may interact with various application data items managed by application 110. For example, such a user interface may be configured to display data items to a user, such as within a window or according to another display technique. The user interface may also be configured to receive and respond to user input to application 110, such as mouse, keyboard, touch, or other input activity detected by computer system 100. For example, the user interface may implement menus or other control features through which a user may perform various application functions. In some embodiments, application data items that may be displayed by and/or selected via application 110's user interface may include audio data items in addition to visual data. In some embodiments, application 110 may be configured to communicate with other applications or systems external to computer system 100, for example via a Local Area Network (LAN) or the Internet. Other types of applications are possible and contemplated. It is noted that while one application 110 is shown, other embodiments may include any number of applications 110.

In various embodiments physical document interface 120 may be configured for both input and output, or for output only. In one embodiment, physical document interface 120 may be configured to receive tactile input, which may include detecting touch or physical objects placed on physical document interface 120. These may encompass tools or brushes or fingers or other everyday objects, or a physical document like a Braille page, or other tactile renderings. In another embodiment, physical document interface 120 may be configured to receive optical input, which may include static or dynamic optical input. For example, input of optical data may encompass scanning functionality, such as to optically capture an image presented to physical document interface 120, or the detection of motion, shape, form, dynamic or static gestures, light patterns or pulses or codes, or other detectable optical information. In another embodiment, physical document interface 120 may be configured to receive electromagnetic input, which may be in the form of radio-based signals or data. For example, physical document interface 120 may be configured to receive input data from Radio Frequency Identifier (RFID)-tagged objects, and/or may receive data according to various wireless interface protocols such as Bluetooth or Wi-Fi, for example. In some embodiments, physical document interface 120 may be configured to implement combinations of these types of input and/or other input types. Also, in some embodiments, physical document interface 120 may be configured to communicate received input data to another device, such as computer system 100. While physical document interface 120 is shown as receiving one physical document 130, in other embodiments, it is contemplated that physical document interface 120 may receive and concurrently process multiple different physical documents 130.

Output from the physical document interface 120 may be visible or invisible. Visible output from the physical document interface 120 may be in the form of illumination appearing on the document or in its vicinity. Such visible illumination may appear beneath, to the side of, or above the document. For example, the illumination may be projected from underneath or from above onto the document surface. In some embodiments, physical document interface 120 may be configured to selectively provide visible output within specific areas of physical document interface 120. The selected areas may range in granularity from relatively coarse to relatively fine in various embodiments. For example, in one embodiment physical document interface 120 may include a pixel-addressable display, such as a liquid crystal display (LCD). In some embodiments, invisible output from the physical document interface may take the form of electromagnetic signals or data, including those that are radio-based.

One embodiment of the physical document interface 120 may include an ordinary flatbed document scanner configured to provide visible illumination using the lighting element normally used during scanning. In another embodiment, an ordinary flatbed scanner may be configured to provide visible illumination by means of an auxiliary lighting element distinct from the lighting element normally used during scanning In some embodiments, the light source enabling output illumination on the physical document interface 120 may be configured to permit selectable illumination. This may entail controlling individual elements of the light source. Such selection may permit the lighting of chosen portions of the document rather than the entire document. For example, one flatbed scanner embodiment of physical document interface 120 may utilize a lighting element that is roughly the width of the scanner's document input surface, which may be swept along the length of the scanner's document input surface in order to sequentially illuminate an entire document. In one such embodiment, illumination of individual elements of the scanner's lighting element may be selectively controlled, such that portions of a document on the scanner's input surface may be visibly indicated.

Embodiments of physical document 130 may include structured or unstructured content. Such content may appear as a number of document data items included on a surface of physical document 130, which may correspond, for example, to a side of the document. Such a surface of a document may also be referred to as a data surface. In embodiments such as sheets of paper, physical document 130 may have two data surfaces, though more are possible (e.g., in embodiments where physical document 130 corresponds to a three-dimensional object). It is not necessary that all data surfaces of physical document 130 actually include content.

Generally speaking, structured content may include content that is divided into particular document data items such as, e.g., portions, sections, fields, or other suitable divisions, where the divisions are indicative of information about the content. In some embodiments, structured content may facilitate the association of a particular item of content with a corresponding type or category, such that the representation of the content via physical document 130 conveys both types of information. For example, physical document 130 may be a form having a number of fields that are defined to reflect particular types of information. In one embodiment, the structure of the content may be explicitly represented by labels, tags, or other identifiers of content structure. For example, in an embodiment where the document data items include various fields, the fields of a form may be individually labeled according to the type of content they represent: a field that includes name data may be labeled "Name;" fields that include income data may be respectively labeled "Interest Income" and "Wage Income;" and so forth. In another embodiment, the structure of the content may be represented according to its physical location within physical document 130. For example, numerical data located within a particular area of physical document 130 (as defined, for instance, relative to the document's dimensions, landmarks, or other frames of reference) may be defined as the document data item "Interest Income" regardless of whether physical document 130 is labeled as such. Exemplary structured-content physical documents 130 may encompass tax forms, medical forms, insurance forms, lottery forms, shipping forms, order forms, tickets, voting ballots, or any of a variety of other such forms, or templates.

By contrast, in other embodiments, physical document 130 may include unstructured content. Generally speaking, unstructured content may include free-form elements which may not necessarily be associated with particular types or categories indicative of some aspect of the content. For example, physical document 130 may include prose as unstructured content. It is noted that in some embodiments, even though the content of physical document 130 may be unstructured, a structure may be externally imposed upon such content, such as by application 110. For example, physical document 130 may include free text that bears no particular organization in terms of fields or categories. In one embodiment, application 110 may impose an organization upon such text, for example by parsing the text into lines, regions, paragraphs, sentences, words, phrases, or other elements. Some physical documents 130 may be implemented in either a structured or unstructured fashion, such as manuals, books, magazines, journals, catalogs, or any of a variety of such publications, which may include text, photographs, images, videos, and auditory or other information.

In some embodiments, physical document 130 may include special identifying marks, such as bar codes or watermarks. Such identifying marks may identify a particular physical document 130 as belonging to a particular category of document (e.g., a particular type or class of form) and/or may uniquely identify a particular instance of physical document 130 from among many or all other instances of physical document 130. Physical document 130 may also include certain patterning, such as crossing points of lines or lengths of lines, with the elements bearing certain relationships to each other. Patterns may encompass geometric or other formed data, images, or character or keyword combinations. In some embodiments, such patterns may serve as reference points from which other features of physical document 130 may be identified. In various embodiments, physical document 130 itself may be made of or may include paper, cloth, plastic, composite materials, semiconductor materials, nanotechnology materials, or any other suitable material, and may be opaque, translucent, transparent, or of variable opacity/transparency. In some embodiments, physical document 130 may be capable of sending or receiving electromagnetic data or signals, and the document may be constructed from materials capable of such sending or receiving. For example, in some embodiments, physical document 130 may include passive or active technology, such as antenna or semiconductor technology, configured to emit or to detectably respond to emitted electromagnetic signals, such that characteristics of physical document 130 (e.g., identifying characteristics) may be observed using techniques that do not involve visible or near-visible light.

Figure 2:
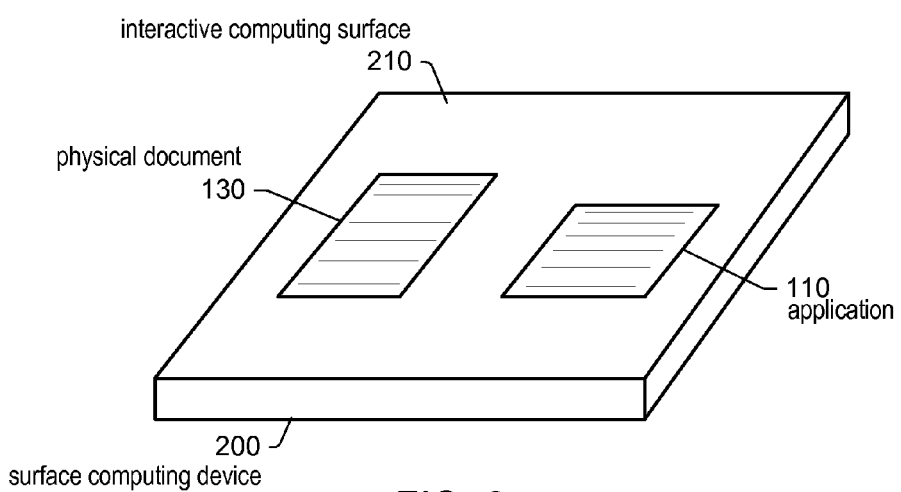
FIG. 2 is a block diagram illustrating one embodiment of an interactive document system integrated into a single surface computing device.

As shown in FIG. 1, computer system 100 and physical document interface 120 are discrete components that may be configured to communicate with one another. In another embodiment, the functionality of computer system 100 and physical document interface 120 may be provided by a single, integrated system. One example of such a system is illustrated in FIG. 2, which shows one embodiment of a surface computing device 200. Generally speaking, surface computing device 200 may be configured to execute applications, such as application 110. In some embodiments, surface computing device 200 may be configured to support applications and operating systems similar to those executed by computer system 100, described above. One example of surface computing device 200 may include the Microsoft Surface™ computer.

In the illustrated embodiment, surface computing device 200 includes an interactive computing surface 210. Interactive computing surface 210 may be configured to implement both input and output functionality. In one embodiment, interactive computing surface 210 may be a multifunctional device configured to implement some or all of the input and display functions of each of physical document interface 120 and computer system 100 described above. For example, interactive computing surface 210 may be configured to support tactile, optical, and/or electromagnetic types of input such as described above. In addition, interactive computing surface 210 may be configured to provide visual output similar to that which might be provided by a typical computer monitor or display device. For example, interactive computing surface 210 may include LCD display technology combined with a translucent or transparent tactile interface as well as document scanning capabilities. In some embodiments, the input/output capabilities may be uniform across interactive computing surface 210, while in other embodiments, different areas of interactive computing surface 210 may be configured to support different types or combinations of input/output functions.

Figure 3:
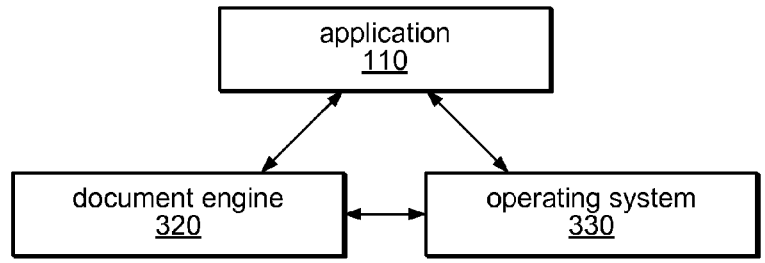
FIG. 3 is a block diagram illustrating one embodiment of a software architecture that may be configured to implement various features of the systems illustrated in FIG. 1 or FIG. 2.

FIG. 3 illustrates one embodiment of a software architecture that may be configured to implement various features of the systems illustrated in FIGS. 1-2. In the illustrated embodiment, application 110 is configured to interact with a document engine 320 as well as with an operating system 330. It is noted that in various embodiments, the elements of FIG. 3 may be implemented within a single system, such as computer system 100 or surface computing device 200, or may be distributed among several distinct computer systems. For example, application 110 may be executable by one computer system (e.g., computer system 100), while document engine 320 may be executable by a different system or device (e.g., physical document interface 120). It is contemplated that in various embodiments, the features of document engine 320 may be implemented by computer system 100, physical document interface 120, surface computing device 200, a distinct system, or any combination of these.

Document engine 320 may perform several functions in the service of correlating physical document 130 and application 110, and the functions may vary depending upon the particular embodiment of the system. Document engine 320 may be configured to receive and interpret data from physical document 130, such as data received from physical document interface 120 as described below. In one embodiment, document engine 320 may manage geometric mapping between the physical document 130 and its data, and the mapping may be used to establish correlation between physical document 130 and application 110. For example, as noted above, physical document 130 may include structured or unstructured content, which may be arranged at various locations on data surface(s) of physical document 130. As described in greater detail below in conjunction with the description of FIG. 4, in some embodiments document engine 320 may implement a coordinate system or other suitable system of reference. The coordinate or reference system may facilitate a mapping from information identifying a particular location or area within a data surface of physical document 130 to information that reflects the content indicated at that location or area.

In one embodiment, document engine 320 may also be configured to maintain a mapping showing the spatial relationship between physical document 130 and physical document interface 120. For example, such a mapping may reflect the position of physical document 130 relative to physical document interface 120. Such mappings may be used in some embodiments to allow visual cues provided by the system, such as those discussed below with respect to FIG. 4, to track physical document 130 if it moves on physical document interface 120. Such mappings may also play a role in positioning visual cues on or near physical document 130. Document engine 320 may be configured to provide data indicative of various types of mappings (e.g., the geometric and/or positional mappings discussed above, or any other suitable mappings) to application 110, and it may receive corresponding data from application 110.

In some embodiments, document engine 320 may facilitate the recognition of physical objects placed on the physical document interface 120, or of content indicated by such objects. For example, document engine 320 may be configured to manage optical character recognition (OCR) functions in some embodiments, which may facilitate the transformation of an image of a character represented on a physical document 130 (e.g., of bits representing pixel data) into an indication of the character itself (e.g., an ASCII code or other uniform representation of the character). Document engine 320 may exchange data related to the recognition process with application 110. Specifically, in some embodiments, using character recognition or other techniques, document engine 320 may be configured to extract data from physical document 120 and facilitate automatic entry of the extracted data, or selected portions of the data, into corresponding fields of application 110.

Document engine 320 may also be configured to coordinate the exchange of data and signals between the physical document interface 120 and application 110. In one embodiment, document engine 320 may send data and/or instructions to physical document interface 120 in response to activity generated by or on behalf of application 110. For example, document engine 320 may send visual cueing signals to the physical document interface. In some embodiments, the signals may cause selected portions of the physical document 130 to be illuminated, as described in greater detail below. Also, in some embodiments, document engine 320 may be configured to convey information received from physical document interface 120 to application 110, as in the data recognition and extraction examples discussed above.

In some embodiments, document engine 320 may be configured to interact with physical document interface 120 via device drivers or other system services that may be provided by operating system 330. For example, operating system 330 may correspond to a suitable version of an operating system such as Microsoft Windows™, Apple MacOS™, Linux™, Unix™, or any other suitable operating system, and may be configured to implement native or third-party device support for physical document interface 120. In other embodiments, document engine 320 may be configured to provide its own software driver or other interface support for interaction with physical document interface 120 independently of operating system 330.

The degree of cooperation and integration between document engine 320 and application 110 may vary in various embodiments. In one embodiment, document engine 320 may provide a standard application programming interface (API) to application 110 through which application 110 may interact with physical document interface 120. Document engine 320 may be tightly integrated with application 110, such that details regarding application 110's use of data types and document structure may also be visible to document engine 320. Alternatively, document engine 320 may be loosely integrated with application 110, such that document engine 320 may primarily operate to maintain mappings of application data and document content without being aware of how application 110 is using its data, or vice versa. In other instances, document engine 320 may be incorporated within application 110 or within operating system 330, and may not exist as a separate entity.

Interactive Document Management

Figure 4:
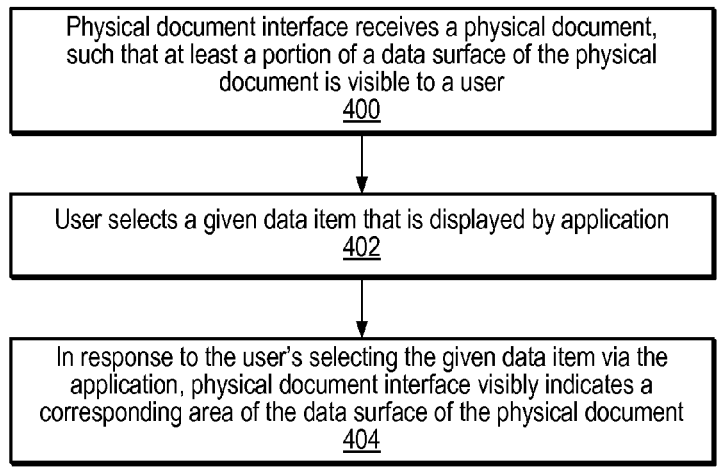
FIG. 4 is a flow diagram illustrating one embodiment of a method for assisting a user in the management of documents.

The systems illustrated in FIGS. 1-2, or suitable variations thereof, may be configured in various embodiments to perform any of a variety of tasks to assist a user in the management of documents. One embodiment of a method of operation of a system such as system 10 is shown in FIG. 4. In the illustrated embodiment, operation begins in block 400 where physical document interface 120 receives a physical document 130, such that at least a portion of a data surface of physical document 130 is visible to a user. For example, a user may place physical document 130 on physical document interface 120 such that a side of physical document 130 that includes data the user wishes to interact with is facing the user. In other embodiments, it is contemplated that physical document interface 120 may receive a document through an automated interface that requires little or no user intervention, such as a mechanical document feeder, for example.

The user selects a given application data item that is displayed by application 110 (block 402). Generally speaking, an application data item may correspond to any data item that may be displayed by application 110 via its user interface, such as text data, numerical data, graphical data, or audio data, for instance. For example, as noted above, application 110 may be a tax application that is configured to perform tax calculations using data items derived from various tax-related documents, such as tax returns, wage statements, and the like. In this example, the user may select a particular financial data item that is displayed by application 110, such as an item of personal income. In various embodiments, the user may select an application data item through appropriate combinations of touch, keystrokes, mouse gestures, or other suitable input to application 110. For example, application 110 may implement, via menus or other features, an interface through which a user may select an application data item for which a corresponding area of physical document 130 should be indicated.

In response to the user's selecting a given application data item via application 110, physical document interface 120 may visibly indicate a corresponding area of the data surface of physical document 130 (block 404). In one embodiment, computer system 100 may cause physical document interface 120 to visibly indicate a location on the surface of physical document 130 that includes one of the document data items corresponding to the application data item selected via the user interface of application 110. For example, application 110 may communicate information regarding the selected data item to document engine 320, which in turn may identify one or more locations of the physical document 130 that correspond to the selected application data item. In some embodiments, document engine 320 may be configured to actively manage the details of visibly indicating the corresponding area of physical document 130, for example, to control the manner and appearance of the visible indication. However, document engine 320 may delegate some aspects of managing visible indications to operating system routines, software drivers, or hardware features.

Continuing in the vein of the tax-related example discussed above, physical document 130 may be a tax form including various data fields at various locations within the document. In this example, document engine 320 may be configured to maintain tables or other data structures that reflect mappings or associations between data items within application 110 and corresponding features of physical document 130. In some embodiments, document engine 320 may maintain data structures that relate various data items within application 110 to areas of physical document 130 from which the data items were directly obtained (e.g., such that there exists a direct correspondence between a particular data value within application 110 and a particular area or field of physical document 130). For example, document engine 320 may map an "adjusted gross income" data value within application 110 with a corresponding field of a physical tax document 130.

The field of the document may be identified according to a suitable coordinate system. For example, document engine 320 may be configured to reference areas of physical document 130 using Cartesian or other suitable coordinates determined relative to the physical boundaries of physical document 130, or using landmarks within physical document 130 (e.g., particular textual or graphical features on the data surface of physical document 130 that may be employed as points of reference from which to express the locations of other document features), or using any other technique for representing the relationships between features of a document and their locations within the document.

In some embodiments, document engine 320 may be configured to relate various application data items within application 110 to areas of physical document 130 from which the application data items were indirectly derived. For example, the "adjusted gross income" data value within application 110 may be derived as a function of other data values that may appear within document data items (e.g., fields) of physical document 130, such as gross income and various above-the-line adjustments. In one embodiment, document engine 320 may represent these indirect relationships, while in other embodiments, indirect relationships between data items and other values from which the data items may be derived may be maintained by application 110 transparently to document engine 320.

In some embodiments, visible indication of a corresponding area of physical document 130 may be in the form of illuminating or otherwise visibly distinguishing a portion of physical document 130 itself. In other embodiments, visible indication for physical document 130 may appear in close proximity to physical document 130, but not necessarily on physical document 130 itself. For example, such indications may appear just outside the periphery of physical document 130. Still other embodiments may provide visibly illuminated indication both within and outside the periphery of physical document 130. Depending upon the embodiment, visible indications for physical document 130 may appear from above, from below, or from the periphery. Visible indications or cues for physical document 130 may assume a variety of types and forms, and may be combined in numerous ways. In some variations, coloring may be used to visibly distinguish corresponding areas of physical document 130. For instance, in the "adjusted gross income" example described earlier, application 110 may highlight the selected application data item using a particular color, and physical document interface 120 may highlight the corresponding field of physical tax document 130 in a similar or matching color. In some instances, multiple correspondences between physical document 130 and application 110 may be distinguished by assigning a different color to each set of correspondence. In other embodiments, correspondences between a selected application data item in application 110 and an area or location of physical document 130 may be visibly indicated using similar display techniques other than similar colors, such as similar animation, shading, or other techniques.

In other embodiments, visibly illuminated indications or cues may include balloons or cartoon bubbles, which may themselves contain other cues, such as text or images. For example, in response to a user's selecting an application data item via application 110, the system may illuminate a corresponding area of physical document 130 while simultaneously exhibiting an information bubble at the periphery of physical document 130, where the bubble and the illuminated area of physical document 130 may be joined by a lighted arrow or line.

According to various embodiments, visual indications, or cues, may include coloring, lighted regions, backlit regions, text, images, information-containing balloons, bubbles, or cartoon bubbles, graphical user interface widgets or controls, animation, connecting lines, dotted lines, patterned regions, arrows, lighted lines, geometric figures such as circles, ovals, triangles and squares, and so forth. According to the embodiment, visual cues may exist separately or in combination, and some visual cues may contain or be linked to others. For example, a cartoon bubble may contain text along with a widget to play related audio material. Depending on the embodiment, visual cues may also be augmented with auditory signals, such as beep and bells, or human or synthesized speech. Visual cues may or may not be interactive, according to the embodiments.

Additionally, it is contemplated that in some embodiments, visual indications that are generated with respect to physical document 130 may track changes in location of physical document 130 with respect to physical document interface 120. For example, if a user shifts physical document 130, physical document interface 120 may detect the new document location. Physical document interface 120 may responsively remap visual indications such that they appear in the same relationship to physical document 130 as they did prior to the document's relocation. In various embodiments, physical document interface 120 may remap such visual indications in a manner that is transparent to document engine 320, or physical document interface 120 may perform such remappings in collaboration with document engine 320.

It is contemplated that in some embodiments, the various types of visual indications described above may be generated with respect to an image or representation of physical document 130 instead of or in addition to being generated with respect to physical document 130 itself. For example, in one embodiment, physical document 130 may be placed face down on physical document interface 120, which may capture an image of physical document 130. Physical document interface 120 may then display the captured image along with the visual indications described above. For example, an interactive computing surface 210 such as that shown in FIG. 2 may be configured to receive physical document 130 in one area of the surface, display an image of physical document 130 in another area, and display application 110 in yet another area. Other variations are possible and contemplated.

Figure 5:
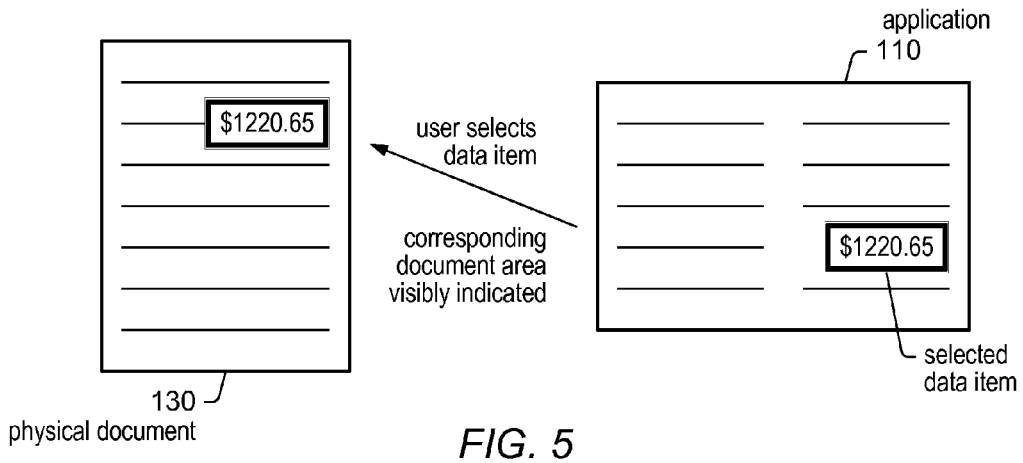
FIG. 5 is a block diagram illustrating one embodiment of the operations illustrated in FIG. 4.

One example illustrating the operations discussed above with respect to FIG. 4 is shown in FIG. 5. In the illustrated embodiment, application 110 is shown displaying a particular application data item: in this case, the value "$1220.65." In response to a user's selecting this data item, a corresponding area of physical document 130 is visibly indicated. As shown in FIG. 5, an area of the document corresponding to the document data item "$1220.65" is highlighted, for example through illumination provided by physical document interface 120. Various embodiments of the system may render the visual display of application 110 in diverse ways. For example, as illustrated in FIG. 1, the visible display of application 110 may appear on a computer monitor or other display device separate from physical document interface 120. In another embodiment, illustrated in FIG. 2, application 110 may be displayed on an interactive computing surface 210 which is also configured to serve as the physical document interface 120 for physical document 130. In certain variations, like the one illustrated in FIG. 2, interactive computing surface 210 may be an element of a surface computing device.

In some embodiments, operations similar to those described above may enable the user to determine whether the selected data value within application 110 properly corresponds to a data value indicated on physical document 130. For example, as described in greater detail below, the data value within application 110 may have been previously derived from physical document 130, for example by manual data entry, optical character recognition, or through other techniques. The process through which the data value was derived from the document contents may be subject to error, such as data miskeying, faulty character recognition, or other sources of error, resulting in a discrepancy between the data value used by application 110 and the value represented by physical document 130. In one embodiment, the techniques described above may enable a user to quickly determine the area of physical document 130 from which a data value was obtained, which may assist the user in determining whether that data value was correctly obtained.

In some embodiments, if a user detects a discrepancy between a data value within application 110 and a corresponding value represented by physical document 130, the user may correct the data value within application 110, such as by interacting with computer system 100. In other embodiments, physical document interface 120 may be configured to present an interface through which the user may provide corrected data. For example, the user may make a correction directly on physical document 130, and physical document interface 120 (e.g., in conjunction with document engine 320), may convert the user's entry to digital data (e.g., using OCR or other techniques) and communicate the data to application 110. In another example, document engine 320 may interact with physical document interface 120 to present an interactive interface through which the user may enter corrected data, e.g., via touch, gestures, or other suitable input. For example, document engine 320 may be configured to present windows, cartoon bubbles, or other features to the user via physical document interface 120. In some embodiments, such an interactive interface may be employed for original data entry in addition to or instead of correction of previously entered data. In one such embodiment, such an interactive interface may facilitate user data entry into an unfamiliar application 110, for example, in the event a user is familiar with the structure of physical document 130 but uncertain as to how to interact with application 110.

Figure 6:
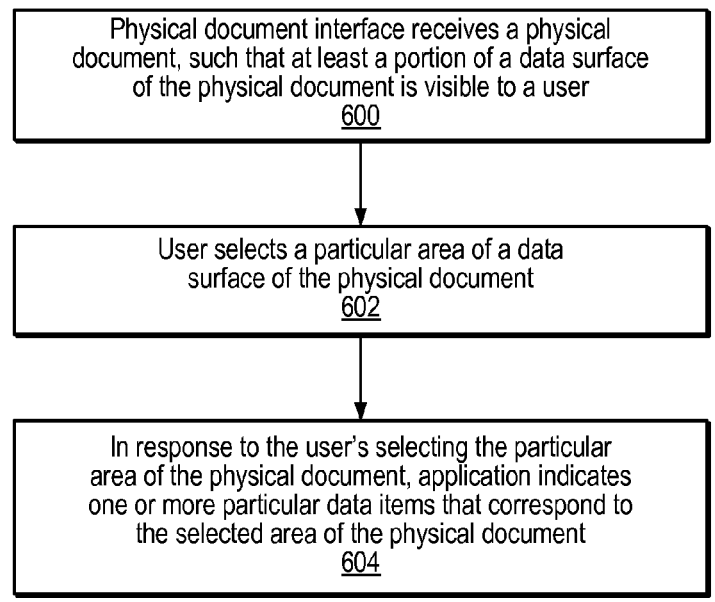
FIG. 6 is a flow diagram illustrating another embodiment of a method for assisting a user in the management of documents.

As just described, embodiments of a system such as that illustrated in FIGS. 1-2 may be configured to present information to a user via physical document interface 120 in response to user activity with respect to application 110. In some embodiments, a system such as system 10 may be alternatively or additionally configured to support the reverse operation, in which user activity with respect to physical document interface 120 may responsively result in corresponding activity with respect to application 110. One embodiment of such a method of operation of system 10 is shown in FIG. 6. In the illustrated embodiment, operation begins in block 600 where physical document interface 120 receives a physical document 130, such that at least a portion of a data surface of physical document 130 is visible to a user. For example, as noted above with respect to FIG. 4, a user or an automated interface may place physical document 130 on a physical document interface 120 so that a side containing data faces the user.

The user then selects a particular area of a data surface of physical document 130 (block 602). For example, as noted above, physical document 130 may be a tax form including various document data items, such as data fields, at various locations within the document. In this example, the user may select a particular area of physical tax document 130, such as a box containing an item of personal income. In various embodiments, the user may select a particular area of physical document 130 through various types of input activity that may be supported by physical document interface 120, such as appropriate combinations of touch, gesture, or other suitable input to select a particular area of the physical tax document 130. In some embodiments, selection of an area on physical tax document 130 may be accomplished directly, such a by touching the area with a finger, brush, stylus, or other object. In other embodiments, the selection may be less direct. For example, the user may simply point to the desired area, or may interact with physical document interface 120 through the use of another device or system, such as a laser pointer, a remotely-controlled pointing device, or a separate computer system. In various embodiments, physical document interface 120 may implement a system for detection of touch, gestures, light patterns or pulses, or other optical signaling. In other embodiments, physical document interface 120 may implement a system for selection by means of a movable illuminated pointer. In some embodiments, the pointer may project light through physical tax document 130. In other embodiments, the pointer may be projected onto physical tax document 130 from above. In some embodiments, physical document interface 120 may be configured to provide feedback to the user confirming the selected area of physical document 130, for example by visibly illuminating, outlining, animating, or otherwise visibly indicating the selected area, by providing audible cues such as clicks, beeps, or voice prompts, or by providing any other suitable type of feedback.

In response to the user's selecting a particular area of physical document 130, application 110 may indicate one or more particular application data items which correspond to the selected area of the physical document (block 604). In one embodiment, physical document interface 120 may transmit information about a particular selected area of physical document 130 to document engine 320. For example, physical document interface 120 may transmit geometric coordinates identifying the selected area to document engine 320. Document engine 320, in turn, may communicate information regarding the particular selected area to application 110, for example by mapping the coordinates provided by physical document interface 120 to one or more application data items within application 110, as described in greater detail below. Application 110 may then indicate one or more application data items that correspond to the selected area of physical document 130. For example, application 110 may highlight or distinguish the corresponding application data item(s) using any suitable interface technique, such as by altering the color or shading of the corresponding data item(s) relative to other items, employing animation or dynamic display techniques (e.g., flashing or alternating content), employing audible cues, or using other suitable techniques or combinations thereof. As noted previously, in some embodiments, physical document interface 120 may be configured to receive multiple different physical documents 130 at once. In some such embodiments, document engine 320 may facilitate the interaction of a single application 110 with multiple physical documents 130 (e.g., coordinating the interaction of a tax application 110 with multiple different types of tax forms such as Form W-2, Form 1099, etc.), or may facilitate the interaction of multiple distinct applications 110 with multiple physical documents 130.

Continuing with the tax-related example discussed earlier, physical document 130 may be a tax form including various fields at various locations within the document. As noted above, in one embodiment, document engine 320 may be configured to maintain data structures that reflect mappings between features of physical document 130, such as document data items, and corresponding application data items within application 110. For example, such data structures may include mappings between a coordinate system or other system of reference corresponding to physical document 130 and one or more data values within application 110. In one such embodiment, document engine 320 may be configured to utilize such mapping information to translate input data corresponding to the document area selected via physical document interface 120 into information indicative of data value(s) known to application 110.

For example, a user may select an area of a tax form via physical document interface 120 according to the techniques discussed above. In response, physical document interface 120 may be configured to communicate coordinates or other identifying information regarding the selected area to document engine 320. Document engine 320 may then apply the received information to its data structure to determine what data values within application 110 correspond to the selected area, if any. For example, the selected area of the document may correspond to an "adjusted gross income" field within application 110. Document engine 320 may then communicate to application 110 that the "adjusted gross income" field has been selected, and application 110 may correspondingly indicate one or more application data items corresponding to adjusted gross income. For example, application 110 may visibly highlight instances where adjusted gross income appear within application 110 using any suitable display technique.

In some embodiments, document engine 320 may employ decision logic configured to resolve imprecise input from physical document 130. For example, if a user selects an area using touch or gestures, the selected area may not correspond precisely to a field of physical document 130 or a corresponding data value within application 110 in the event that the user's input overlaps portions of physical document 130 that correspond to other document features. In various embodiments, document engine 320 may resolve such ambiguity or imprecision by weighting the mapping in favor of a particular portion of the selected area (e.g., its geometric center, a particular edge, or a particular region), by analyzing the degree of overlap between the selected area and various possible data value mappings, by taking historical or other user context into account (e.g., by considering the user's previous selection), or using any other suitable technique or combination of techniques.

In some embodiments, the relationship between a particular selected area of physical document 130 and corresponding data item(s) from application 110 may be complex or indirect, rather than a simple one-to-one matching of a selected area of physical document 130 to one application data item within application 110. In various embodiments, document engine 320 may be configured to map a particular selected area of document 130 to data items within application 110 upon which the particular selected area functionally depends, or to data items within application 110 that functionally depend upon the particular selected area. For example, the "adjusted gross income" field on physical tax document 130 may depend upon numerous data items from application 110 (e.g., wage income, interest income, etc.) that function together to compute an adjusted gross income figure. Alternatively, the "adjusted gross income" field of physical tax document 130 may reflect a data value on which one or more data items within application 110 depend (e.g., gross income tax due, net refund, etc.). In some variations, when a user selects an area corresponding to the "adjusted gross income" field on physical tax document 130, application 110 may respond by presenting, highlighting, or otherwise indicating several data items used by application 110 in computing the "adjusted gross income" field on physical tax document 130, or by indicating one or more data items that application 110 determines dependent upon the value of the "adjusted gross income" field.

As another example, physical document 130 may be a post card advertisement for an upcoming concert. Document engine 320 may relate the post card to a web site managing the concert using data from application 110 in the form of a web browser. In response to a user's indicating a price level on the post card advertisement, application 110, in the form of a web browser, may present an array of available seating choices, along with calendar dates, and other information. In certain embodiments, document engine 320 may represent complex or indirect relationships, while in others, complex or indirect relationships between data from application 110 and particular areas of physical document 130 may be derived and maintained by application 110 transparently to document engine 320.

Figure 7:
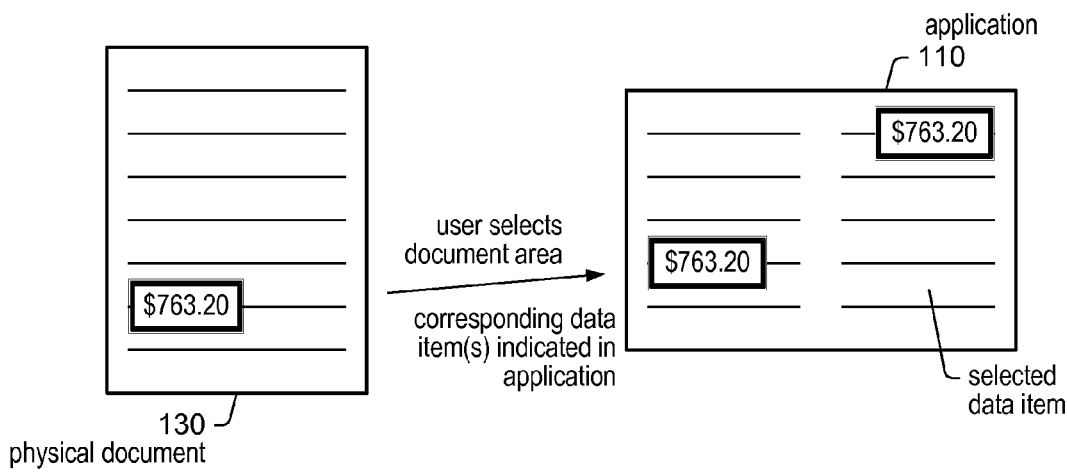
FIG. 7 is a block diagram illustrating one embodiment of the operations illustrated in FIG. 6.

One example illustrating the operations discussed above with respect to FIG. 6 is shown in FIG. 7. In the illustrated embodiment, physical document 130 is shown with a particular area, namely a box or field containing the value "$763.20." In response to a user's selecting this particular area of physical document 130, corresponding data items are indicated in application 110. As shown in FIG. 7, in this example, two data fields within application 110 are highlighted, where each highlighted field contains a data value corresponding to the one selected by the user. For example, the highlighted fields may be data values within application 110 that correspond to instances of the data field selected within physical document 130. In other instances, the highlighted fields within application 110 may correspond to data values that functionally depend on the data field selected within physical document 130, or data values on which the data field selected within physical document 130 functionally depends. Various embodiments of the system may render the visual display of application 110 in diverse ways. For example, as illustrated in FIG. 1, the visible display of application 110 may appear on a computer monitor or other device separate from physical document interface 120. In another embodiment, illustrated in FIG. 2, application 110 may be displayed on an interactive computing surface 210 that is also configured to serve as the physical document interface 120 for physical document 130. In certain variations, like the one illustrated in FIG. 2, interactive computing surface 210 may be an element of a surface computing device.

In some embodiments, operations similar to those described above may enable the user to determine whether selected particular areas from physical document 130 and the data they contain properly correspond to data values indicated within application 110. For example, as noted above with respect to FIG. 4, errors may occur in the entry of data values into application 110 from physical document 130. Using the techniques described above with respect to FIGS. 6-7, a user may be able to quickly verify whether data within a particular area of physical document 130 properly corresponds to data item(s) within application 110. In other instances, the techniques described above may enable a user to explore dependency relationships pertaining to a familiar or unfamiliar document. For example, using the above techniques, a user may select a particular data field within physical document 130 and observe, via application 110, those data values that rely on the particular data field, or those data values on which the particular data field relies. This may enable a user to understand the significance or scope of a discrepancy between physical document 120 and application 110, or may enable a user to understand more generally the significance of various data fields of physical document 120 as they relate to application 110.

As described in detail above, in various embodiments, a user may interact with physical document 130 in a variety of ways via physical document interface 120. When a user initially begins working with a particular physical document 130, physical document interface 120, document engine 320, and/or application 110 may be initialized with respect to the particular physical document 130 in a number of ways. In one embodiment, the user may explicitly provide to application 110, or to document engine 320, information sufficient to identify a type and/or a unique instance of physical document 130. For example, the user may select the document type from a list or may supply document identifier(s) that are generic to a document type (e.g., IRS Form 1040). The user may also supply information that narrows physical document 130 to a particular instance (e.g., a Social Security Number identifying a particular Form 1040).

In another embodiment, physical document interface 120 may capture information from physical document 130 that may facilitate automatic document identification. For example, the user may initially place physical document 130 face down on physical document interface 120, and image data may be captured from the document's data surface. Such data may be processed, for example, by document engine 320, to identify physical document 130. For example, document engine 320 may apply OCR techniques to attempt to identify physical document 130 from textual features. Document engine 320 may also identify physical document 130 from bar codes, graphical features, or other identifying marks. In some embodiments, the arrangement of features on a particular physical document 130 may form a signature that may be sufficient for document engine 320 to generically or uniquely identify the document, for example through application of a hash algorithm or other suitable algorithm.

In some embodiments automatic identification of physical document 130 may occur using image data captured from a surface other than the document's data surface. For example, depending on factors such as the translucency of document 130 and capabilities of physical document interface 120, sufficient identifying information may be obtained from the reverse side of a physical document 130 that is placed face up on physical document interface 120. In other embodiments, physical document 130 may be identified on the basis of other document characteristics, such as its electromagnetic characteristics, an RFID tag, or any other suitable characteristics.

Surface Computing and Object-Based User Interfaces

Historically, data input and output functions of computer systems have been implemented with discrete components in a segregated fashion. For example, conventional computer systems often include a display device configured only for output, as well as a keyboard, mouse, scanner or other devices configured only for input. As computer application software evolved, user interfaces for software reflected this dichotomy in the underlying hardware.

Typical application user interfaces involve windows, menu systems, drag-and-drop features, and other techniques for displaying data via a device that is primarily oriented towards data output. In some instances, as discussed above, application data may be derived from data possessed by a physical object, such as a physical document. For example, application data may be derived from the contents of forms, lists, or any other suitable type of structured or unstructured document. However, the typical mode via which such application data is derived from a physical object includes an input step that occurs by way of an input device, such as manual entry via a keyboard, optical data capture via a scanner, or another suitable manner of gathering input. During such data input, the physical object often occupies a peripheral role: it is an artifact containing useful data that is to be mapped to a structure that is dictated by the application. For example, the application may organize a document's data in a manner completely different from the way the data appears on the document itself. Once data is input to the application, the object from which data was obtained may no longer be used. For example, after the desired data has been captured from a document, a user may proceed to work with this data solely via the user interface provided by the application.

With the advent of devices such as surface computing device 200, a different paradigm may be possible for user interfaces that relate applications and physical objects, such as documents. As noted above with respect to FIG. 2, a surface computer such as surface computing device 200 may include an interactive computing surface 210 that is configured to provide output capabilities, such as the display of visual data, as well as input capabilities, such as the ability to receive input data via touch-sensitive, optical, electromagnetic, or other types of interfaces. Unlike in a conventional computer system in which data input and output interfaces are typically physically and logically separate from one another, in surface computing device 200, input and output functionality may be integrated. This raises the possibility that an application interface may be displayed via interactive computing surface 210 with an object, such as a physical document, as a central feature of the interface, in contrast to conventional interfaces in which a representation of the application (such as a window on a display device) may be the central feature and in which a physical object may play a peripheral or even disposable role.

In the following discussion, a variety of techniques for implementing user interfaces for surface computing systems are explored. First, there is a description of diverse physical objects bearing encoded data with which the systems may interact. An explanation of the phases of interaction with physical objects follows, including early stages for identifying objects and reading their data, and later stages for providing user interfaces on an interactive display surface. Next, operational aspects are discussed, including those for hardware elements which participate in certain operations. A software architecture for managing assorted features of the system is described afterwards. Finally, a flow chart is provided to encapsulate the main operational points.

Figure 8A:
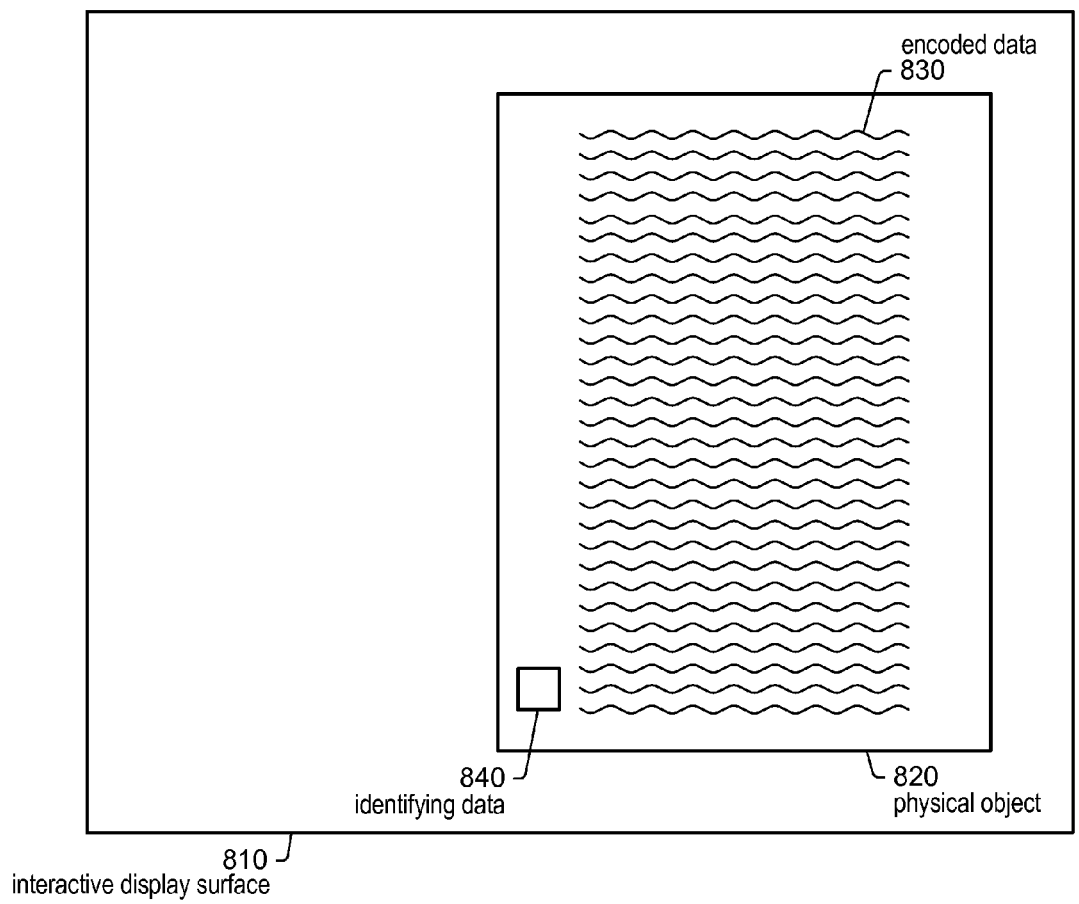
FIGS. 8a-8c are block diagrams which collectively illustrate embodiments of a system for interfacing with objects using a surface computer.

One embodiment of a physical object 820 located on an interactive display surface 810 is illustrated in FIG. 8*a*. In various embodiments, interactive display surface 810 may correspond to interactive computing surface 210 illustrated in FIG. 1. In the illustrated embodiment, interactive display surface 810 is shown immediately after placement of physical object 820, but before commencement of subsequent operations, such as identification of physical object 820 by surface computing device 200.

According to various embodiments, physical object 820 may encompass a wide variety of articles. In some embodiments, physical object 820 may correspond to physical document 130 illustrated in FIG. 2. Exemplary physical documents 130 may include tax forms, medical forms, insurance forms, lottery forms, shipping forms, order forms, tickets, voting ballots, coupons, or any of a variety of other such forms, or templates. Physical object 820 may be any other type of object. For example, according to various embodiments, physical object 820 may be a blueprint for an architectural, electronic, industrial, or other category of design. Physical object 820 may also be a mockup or physical prototype of a particular design, such as an automobile or airplane part, or other machinery component. In other embodiments, physical object 820 may be a prototype for a medical device such as a stent or artificial joint or prosthesis. Physical object 820 may also be an actual instance of a machinery component or an electronic component, or of a medical device, including one that has already been in service and may require analysis. In yet other embodiments, physical object 820 may be merely a fragment of a larger entity, such as a machine, an organism (e.g., a cross section of a tree or a bone), or a relic (e.g. a patterned pottery shard or a fossil or symbol-bearing stone). Physical object 820 may also be a medium for storing and examining patterns, such as a slide bearing fingerprints. There is a broad range of possibilities for embodiments of physical object 820.

Physical object 820 may possess identifying data 840. In various embodiments, identifying data 840 may include special identifying marks, such as bar codes or watermarks or images. Various embodiments of identifying data 840 may include both unique identifiers, like serial numbers, and class or type identifiers, like model or category numbers. Identifying data 840 may be tagged, embossed, engraved, stamped, molded, carved, glued, or otherwise affixed to or formed in physical object 820. Radio Frequency Identification (RFID) technology may be employed in some embodiments of identifying data 840. In some embodiments, physical characteristics such as shape, size, weight, color, or others may constitute identifying data 840.

Identifying data 840 may be used to indicate that physical object 820 belongs to a certain category, or type. For example, it may pinpoint where a certain physical document fits within a broad family of types of forms. Or, it may determine that physical object 820 represents a particular model of a product. Physical object 820 may be embodied as a document, with identifying data 840 embodied as a printed classification code indicating that the document belongs to a particular class. A particular exemplary embodiment is provided by IRS Form 1040. Labels in the lower right-hand and upper left-hand corners serve to directly identify the form, as does the geometric and print pattern of the form. These may constitute identifying data 840 for IRS Form 1040 which distinguish it as a United States Internal Revenue Service form of category 1040.

In other embodiments, identifying data 840 may be used to uniquely identify physical object 820 as a particular instance among several of its kind For example, physical object 820 may be embodied as a circuit board, with identifying data 840 implemented as a stamp indicating both a batch and a serial number.

Physical object 820 may possess encoded data 830, including data other than data which may be used to directly identify physical object 820. Embodiments of encoded data 830 are highly variable and diverse. Exemplary embodiments may include tax forms, as in the case of IRS Form 1040. In the case of IRS Form 1040, encoded data 830 includes textual, formatting, and geometrically patterned matter (e.g. grid lines, boundary lines, rectangles, and shaded blocks, triangles, and circles) printed on the form before it is filled out by a user of the form. Encoded data 830 may also include information which a user enters on the form. For embodiments of physical object 820 as a tax form, medical form, insurance form, lottery form, shipping form, order form, or the like, encoded data 830 again may include textual, formatting, and geometrically patterned matter printed on the form before it is filled out by a user of the form, as well as information entered on the form by a user. Physical object 820 may be realized as an architectural blueprint, with encoded data 830 including text, symbols, drawing, geometric patterns, and other data used in expressing architectural designs. Where physical object 820 is embodied as a prototype for a machinery component, such as an airplane part, encoded data 830 may include symbolic information appearing on the part, and may also include geometric, spatial, dimensional, and functional characteristics inherent in the physical design of the part. Similar attributes may apply to embodiments of physical object 820 as a medical device, or other such component. For an embodiment of physical object 820 as an archaeological relic like a symbol-bearing stone, encoded symbols as well as physical characteristics of the stone may constitute encoded data 830.

In some embodiments, encoded data 830 may include human-readable content. Generally speaking, human-readable content may encompass any type of content that may be perceived by a human without necessary transformation of the content by an assistive apparatus. For example, human-readable content may include any type of content that may visually perceptible by a human, such as alphanumeric characters, handwriting, line drawings, graphic imagery, color, three-dimensional features (e.g., surface relief, texture, or shape) and the like. In some instances, human-readable content may also include content that is perceptible by human senses other than vision. For example, human-readable content may include tactile features (e.g., Braille content), audible features (e.g., music or other sound), or olfactory features.

By contrast, humans cannot directly perceive encoded digital data, such as bits representative of encoded visual or audio content, unless such encoded data is decoded and transformed into a type of data that can be perceived by a human (e.g., via a display device such as a video display or audio speaker). Thus, encoded digital data is not itself human-readable content, although it may be transformed into human-readable content via a suitable device such as a computer. It is noted that while perception of various types of human-readable content may be facilitated by an assistive apparatus, such as magnifying optics, amplification, or other devices, such apparatus is not essential to the human perception of human-readable content, whereas in the case of content that is not human-readable, some type of apparatus is necessary in order to transform the non-human-readable content into a form that is human-readable.

In some embodiments, encoded data 830 may include only physical characteristics or attributes of physical object 820, such as shape, weight, color, patterning, or other detectable features. For example, encoded data 830 may be embodied as shape, coloring, markings, and patterns occurring on pieces of a jigsaw puzzle, or on a cross section of a tree. Encoded data 830 may be formed into physical object 820 by human action using tools, or it may be formed without direct human involvement. A tax form printed by a government office and subsequently filled out by a taxpayer provides an illustrative embodiment of human-formed encoded data 830 applied to a physical object 820. A cross section of a trees affords an exemplary embodiment of a physical object 820 whose encoded data 830 has formed without human involvement, as with annular growth patterns or disease patterns.

In typical operation, surface computing device 200 initially identifies physical object 820, either directly or indirectly, after its placement on interactive display surface 810. In those embodiments where physical object 820 possesses identifying data 840, surface computing device 200 may directly identify physical object 820 by detecting and processing identifying data 840. In such instances, certain hardware components of surface computing device 200, such as sensors, cameras, illuminators, and the like, may gather from identifying data 840 information needed for surface computing device 200 to recognize and identify physical object 820. Similar components may also be configured to gather encoded data 830, for example according to optical or other techniques. According to various embodiments, such devices may operate to gather data, such as identifying data 840 and/or encoded data 830, from beneath, to the side of, or above physical object 820.

For purposes of this and later discussion, it is useful to cite an exemplary embodiment, whose goal is the preparation, completion, and filing of a tax return. Here physical object 820 may be embodied variously as an IRS Form 1040, an IRS Form 1099, a W-2 form, a receipt, or any other sort of record used in preparing a tax return. In this exemplary tax preparation embodiment, physical object 820 may be, for instance, an IRS Form 1040. After the user places the IRS Form 1040 on interactive display surface 810, surface computing device 200 may directly identify the form by optically detecting and processing identifying data 840, in this instance labels in the lower right-hand and upper left-hand corners, or geometric and print patterning on the form. In this and similar embodiments, sensing apparatus within surface computing device 200 may illuminate and optically detect some combination of the corner identifiers and geometric and print patterning. Device drivers associated with the sensing apparatus may then relay the captured optical data to a software component of the system referred to henceforth as an object management engine. (The object management engine and other elements of the software system will be described in greater detail below with respect to FIG. 9.) Subsequently, the object management engine may pass the captured optical data to a part of the system capable of resolving the identity of the tax form. The resolution of the tax form's identity may occur using only data stored within surface computing device 200, or it may, in other instances, require reference to a system and/or database separate from but networked to computing device 200.

In an embodiment where identifying data 840 does not appear separately from encoded data 830, direct identification of physical object 820 from identifying data 840 may not be feasible, so that surface computing device 200 accomplishes identification of physical object 820 by indirect inference through reading and interpreting encoded data 830. For example, surface computing device 200 may optically gather encoded data 830 from physical object 820, and may perform optical character recognition, image classification, or another suitable type of algorithm to infer the type or identity of physical object 820 from its encoded data 830.

The exemplary tax preparation embodiment provides an example of indirect identification of physical object 820. In some instances physical object 820 may be embodied as a sales receipt for gasoline which lacks identifying data 840 appearing separately from encoded data 830. In such an instance, sensing apparatus within surface computing device 200 (such as, e.g., a visible- or invisible-spectrum optical sensor operating in concert with a suitable source of illumination) may, through detection and interpretation of encoded data 830, recognize physical object 820. For a gasoline sales receipt, the object management engine may, alone or in conjunction with other modules or applications, recognize the name of an oil company appearing in encoded data 830, along with keywords like "gasoline" or "gallons." Surface computing device 200 may then properly categorize the sales receipt. In various embodiments, a user may assist in classifying the form through interaction with system. For example, the system may prompt a user to verify that physical object 820 is a gasoline sales receipt, rather than some other type of document, or may otherwise query the user for help in correctly classifying physical object 820.

Figure 8B:
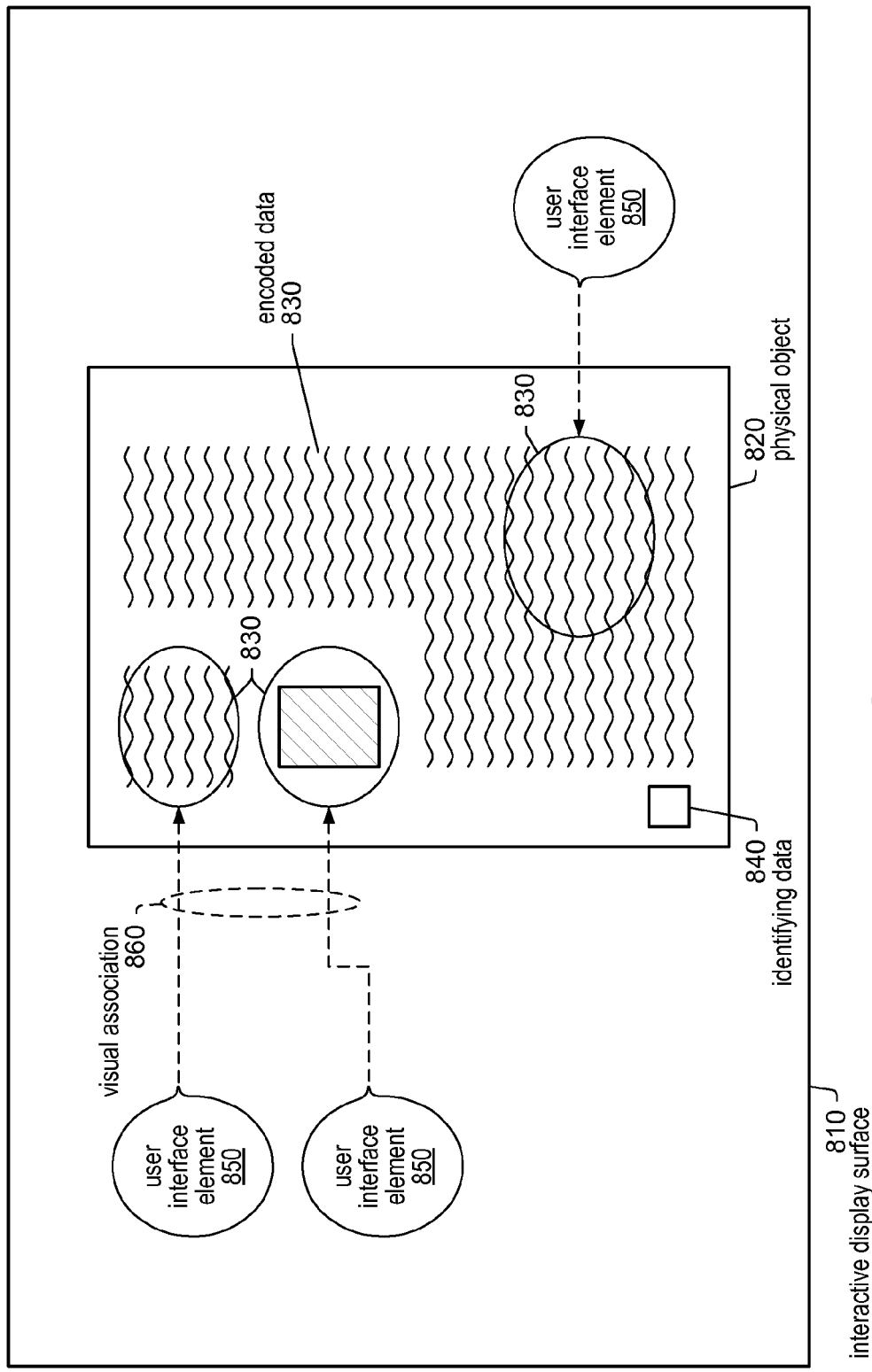

Once physical object 820 has been identified, the system may allow the user to work with physical object 820 via various applications, and may provide user interface elements to facilitate the work process. FIG. 8*b* illustrates an embodiment of interactive display surface 810 as it may appear subsequent to the placement and recognition of physical object 820. Various user interface elements 850 are exhibited, with each appearing in visual association 860 with some portion of the encoded data 830 of physical object 820.

In general, user interface elements 850 collectively form a user interface for at least one software application. User interface elements 850 are generated in conjunction with the reading of encoded data 830, and with the subsequent identification of software applications suitable to operate in concert with the encoded data 830 of physical object 820.

User interface elements 850 may include many and diverse elements. In general, they may enable communication between a user and surface computing device 200, and they may facilitate interaction between a user and various software applications.

In facilitating this interaction, the elements constitute a user interface between a user and a software application. User interfaces for software applications have often traditionally appeared on a computer monitor, frequently in rectangular format. The object management engine, operating together with surface computing device 200, provides user interface elements 850 which are displayed around the physical object on interactive display surface 810 in close proximity to physical object 820. The elements are displayed in association with physical object 820, and provide a user-observable connection with software applications running either on surface computing device 200 or on a separate device, depending upon the embodiment. In various embodiments, user interface elements 850 may be provided even if corresponding software applications do not have a user interface, or do not have a user interface enabled to appear on interactive display surface 810 visually associated with a portion of encoded data 830 of physical object 820.

User interface elements 850 displayed on surface computing device 200 may have both visual and auditory characteristics, according to various embodiments. User interface elements 850 may include both static and dynamic characteristics, and may allow for both input and output. Exemplary embodiments of user interface elements 850 may include visibly illuminated indications or cues like balloons or cartoon bubbles, which may themselves contain other cues, such as text or images. For example, as shown in FIG. 8*b*, the system may illuminate a portion of encoded data 830 while also exhibiting an information bubble at the periphery of physical object 820, where the bubble and the illuminated area of encoded data 830 may be joined by a lighted arrow or line.

According to various embodiments, visual indications, or cues, may include coloring, lighted regions, backlit regions, text, images, information-containing balloons, bubbles, or cartoon bubbles, graphical user interface widgets or controls, animation, video, connecting lines, dotted lines, patterned regions, arrows, lighted lines, geometric figures such as circles, ovals, triangles and squares, and so forth. According to the embodiment, visual cues may exist separately or in combination, and some visual cues may contain or be linked to others. For example, a cartoon bubble may contain text along with a widget to play related audio material. Depending on the embodiment, visual cues may also be augmented with auditory signals, such as beep and bells, or human or synthesized speech. Visual cues may or may not be interactive, according to the embodiments.

According to various embodiments, user interface elements 850 may respond to diverse sorts of input, including that made with a keyboard, touchpad, mouse, laser pointer, or other device mediating input to surface computing device 200. Such input devices may include wireless appliances capable of communicating with surface computing device 200. In some embodiments, input may be made to interactive display surface 810 without using such a mediating device, by way of presenting a physical object on or near interactive display surface 810, or by way of gesture, touch, or auditory signal.

In an exemplary embodiment where physical object 820 is an architectural blueprint, encoded data 830 may include text, symbols, drawing, geometric patterns, and other elements used in expressing an architectural design. After it identifies the blueprint and reads a portion of or all of the encoded data 830, surface computing device 200 may select software applications capable of functioning in concert with design information encoded in the blueprint. Surface computing device 200 may then display a user interface for at least one of the selected software applications, revealing interface elements 850 on interactive display surface 810 such that they are visually associated with the blueprint. An exemplary embodiment of a software application for this instance is a computer aided design (CAD) program for interpreting and modifying blueprint data. In another exemplary embodiment, physical objects 820 may include fragments of a relic bearing symbols written in an earlier age. Following system identification of the fragments, a software application used to reassemble or to classify them may be instantiated, and interactive display surface 810 may show a user interface for the software application. Through successive placement and movement of fragments upon interactive display surface 810, and by means of corresponding interaction using interface elements 850, the user may accomplish reassembly, classification, and cataloguing of information about the relic. The user may, in such an instance, add to the store of knowledge surrounding such relics, and/or properly place the relic within some taxonomic scheme.

The earlier exemplary embodiment whose goal is the preparation, completion, and filing of a tax return further illustrates how the system may operate. In this instance, encoded data 830 may include textual, formatting, and geometrically patterned matter printed on the form before it is filled out by a user. Encoded data 830 may also include information which a user enters on the form. Subsequent to identification of the IRS Form 1040, surface computing device 200 may read encoded data 830, which here may include text, formatting, geometric patterning, and information entered on the form by the user. According to the read encoded data 830, surface computing device 200 may select one or more software applications related to encoded data 830. Surface computing device 200 may then generate and display a user interface for one or more of the selected software applications on interactive display surface 810 in such a way that the various user interface elements 850 are visually associated with the IRS Form 1040.

User interface elements 850 may be of various types. For example, a user interface element 850 may be embodied as a bubble containing information, where the bubble is associated with a portion of encoded data 830 appearing on the IRS Form 1040. Interactive display surface 810 may illuminate a portion of the tax form in a color matching the color of a bubble containing information about the data in that portion of the form. Some user interface elements 850 may be interactive, and may ask the user a question about a part of the tax form, requesting the user to enter a response. In some instances, user interface elements 850 may present various options to the user, requesting that the user make a selection. For example, interactive display surface 810 may illuminate the entry field for block 26 of IRS Form 1040 (the one for moving expenses) in yellow light, while displaying a matching yellow information bubble containing related information. Text within the yellow information bubble may inform the user that field 26 of IRS Form 1040 needs to be filled in, and may request that the user enter a number for that field. If the user makes a nonzero entry, the yellow information bubble may ask him or her to fill out IRS form 3903, while presenting a new user interface element 850 to assist the user in completing IRS form 3903. The new user interface element 850 may contain buttons allowing the user to choose voice recordings offering guidance in working with IRS form 3903.

In general, the system may free a user from needing to know in advance which software applications may correspond to his particular project, and it may also free a user from knowing particular traditional user interfaces which may be built in to such software applications, like the traditional rectangular interfaces which typically appear on a computer monitor. According to various embodiments, placement of physical object 820 onto interactive display surface 810 may automatically launch one or more software applications relevant to physical object 820. In some such embodiments, launching of applications may occur without the need for further user input or interaction beyond placement of physical object 820 onto interactive display surface 810. For example, applications may be automatically launched dependent upon the surface computer's recognition of the type of physical object 820 received by interactive display surface 810, or dependent upon the particular combination of physical objects 820 that may be present.

Following the initial appearance of user interface elements 850 on interactive display surface 810, the user interface may change state as new user interface elements 850 and new visual associations 860 are dynamically generated in response to user interaction with the interface, or in response to further reading of encoded data 830, or to both. As the process of successive interaction with the user interface and/or successive reading of the encoded data 830 continues, more software applications may be identified for further operations, and new user interface elements 850 for interaction with those software applications may appear on interactive display surface 810. Conversely, user interfaces for some software applications may disappear from interactive display surface 810 if they are not needed for further processing.

In reference to the exemplary tax return embodiment, a user may place a blank IRS Form 1040 showing no user-supplied data on interactive display surface 810. After surface computing device 200 identifies the form, it may display a collection of user interface elements 850 associated with the form. An interface element 850 may ask the user whether to extract pertinent information from another source, such as a computer disk storing tax information from a previous year's filing, or a payroll service with an Internet database, or a bank providing data online, or some other source. For instance, if the user indicates a desire to download data from a bank, an interface element 850 may instruct the user to place an IRS Form 1099 on interactive display surface 810. After identifying the 1099 form and reading encoded data 830 which appears on that form, surface computing device 200 may display more interface elements 850 for a Web application capable of downloading the appropriate detailed data from the bank. Further input, including steps for securely authenticating the user, may follow. Alternatively, in some instances, surface computing device 200 may download the desired data from the bank transparently to the user, without requiring active user involvement via the interface. In general, user interface mediation of various activities occurring during the process may or may not be required. In some instances, surface computing device 200 may transact certain operations without displaying a corresponding interface element 850, while in other instances, it may present interface elements 850 for communicating with the user. As the preparation of the user's tax return proceeds, the user may place several documents on interactive display surface 810, and may also make numerous responses via user interface elements 850 as they appear. During the process, surface computing device 200 may identify various physical objects 820 as the user places them on interactive display surface 810, and may also identify corresponding software applications required for the completion of a task, like preparation of a tax return. At any stage of the process, surface computing device 200 may display user interface elements 850 allowing a user to interact with software applications.

Recognition and identification of a particular physical object 820 may be made within a contextual environment in which the presence of other physical objects 820 on interactive display surface 810, and/or the running of software applications, may affect the manner in which the system responds to the placement of the particular physical object 820 on interactive display surface 810. That is, in some embodiments, the presentation of interface elements 850 may depend on the current operational context of surface computer 200. At any given time, this operational context may include the presence of physical object(s) 820 and/or various interface elements 850 on interactive display surface 810. Thus, in some embodiments, the application(s) that may be launched or the interface element(s) 850 that may be generated in response to interactive display surface 810 receiving a particular physical object 820 may differ depending upon the physical object(s) 820 and/or interface element(s) 850 already present. This may provide for a context-sensitive interface in which a user's experience with surface computer 200 may evolve differently depending upon the combination of physical object(s) 820 present and/or the order in which they were received by interactive display surface 810.

For example, in reference to the exemplary tax return embodiment, a user may have already placed an IRS Form 1040 on interactive display surface 810, and may be in the process of interacting with the IRS Form 1040 via user interface elements 850 for a tax preparation application. At some point during the process, the user may place a gasoline sales receipt on interactive display surface 810. Knowing that there is already an IRS Form 1040 on interactive display surface 810, and that there is current user interaction involving the IRS Form 1040 and the tax preparation application, the system may elect to present interface elements 850 for vehicle expense deduction in association with the gasoline sales receipt. In another embodiment, the same gasoline sales receipt may be placed by a user on interactive display surface 810 when there is no tax preparation activity currently in progress. In such an instance, the system may respond by presenting interface elements 850 for a check-balancing application instead of a tax preparation application.

The visual association of various user interface elements 850 with physical object 820 may be realized in various and diverse ways. FIG. 8b indicates visual association 860 by means of dotted lines connecting various user interface elements 850 with corresponding portions of the encoded data 830. The dotted-line indication in FIG. 8b is meant to suggest, rather than to literally depict, an association between user interface elements 850 and portions of the encoded data 830. According to various embodiments, such association may be indicated in practice by multiple and diverse types of cues. For example, color-matching illumination may visibly associate certain user interface elements 850 with corresponding portions of the encoded data 830. In some instances, certain user interface elements 850 may be tied to corresponding portions of the encoded data 830 with connecting lines, or with arrows, or with other visible geometric rendering. The association may also include the use of audible cues, or other suitable indication.

Subsequent to its identifying physical object 820, surface computing device 200 reads encoded data 830, as may be needed to initiate and continue processing. In one embodiment, surface computing device 200 reads encoded data 830 passively with respect to physical object 820, without using an active electronic interface between surface computing device 200 and physical object 820. Examples of active electronic interfaces include Bluetooth, Wi-Fi, ZigBee, Wireless USB, Transferjet, and others. As surface computing device 200 actively reads encoded data 830, the encoded data 830 remain passive, without generating electronic signals according to a standard protocol. It is surface computing device 200 which actively probes physical object 820, for example by sending electromagnetic waves, either from an optical or an invisible portion of the electromagnetic spectrum, according to various embodiments. In response to electromagnetic waves directed at physical object 820 by surface computing device 200, physical object 820 may passively reflect or scatter the input received. This reflected or scattered output by physical object 820 is simply a passive response to the input received from surface computing device 200 determined only by physical properties of physical object 820, and not of any signal-generating circuitry that would be capable of producing an output without having received an input signal. In an exemplary embodiment where the encoded data 830 includes written characters, they may be passively read through optical scanning and optical character recognition. In some instances, encoded data 830 may be read by sending infrared waves to physical object 820. Surface computing device 200 may contain a variety of hardware devices to enable the reading of encoded data 830, such as various sensors, cameras, illuminators, and projectors operating in optical, infrared, or other spectra.

There may be embodiments in which identifying data 840 for physical object 820 exists separately from the encoded data 830. In some such instances, identifying data 840 may be configured to permit an active electronic exchange with surface computing device 200. For example, in certain embodiments where identifying data 840 for physical object 820 exists separately from the encoded data 830, identifying data 840 may be embodied as an active RFID tag with its own internal power source, allowing the tag to broadcast a signal to surface computing device 200 for the purpose of directly identifying physical object 820. In any event, such an active exchange between surface computing device 200 and physical object 820 may occur only for the for the purpose of directly identifying physical object 820, and only when identifying data 840 is separate from encoded data 830. For any reading of the encoded data 830 by surface computing device 200, the encoded data 830 remain passive, without generating electronic signals, as described previously.

Figure 8C:
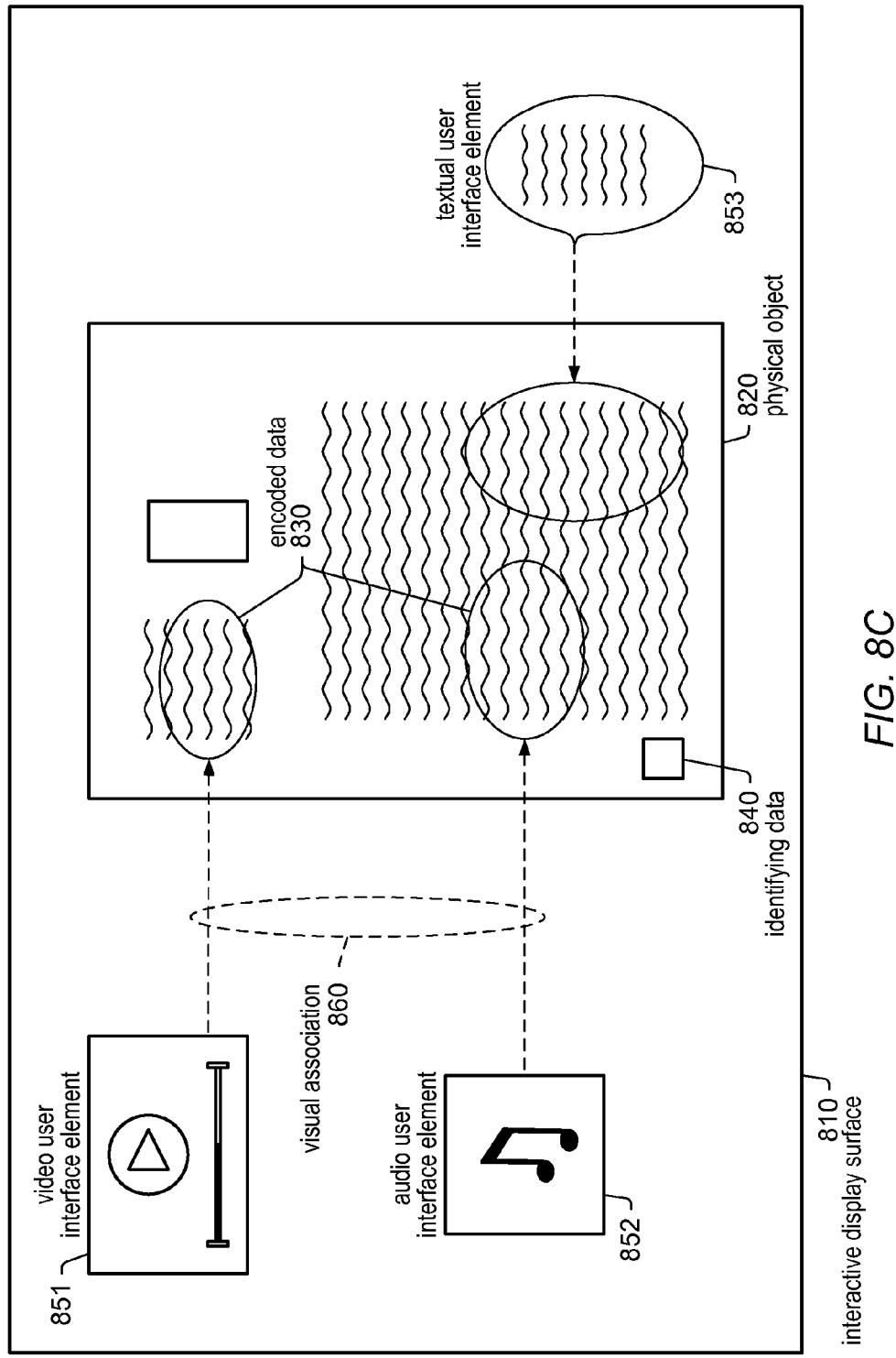

As discussed above with respect to FIG. 8b, user interface elements 850 may be implemented in a variety of ways. FIG. 8c illustrates further examples of this variety and diversity of embodiments of user interface elements 850. FIG. 8c illustrates an another embodiment of interactive display surface 810 as it may appear subsequent to the placement and recognition of physical object 820. Various user interface elements 850 are exhibited, with each appearing in visual association 860 with some portion of the encoded data 830 of physical object 820. Video user interface element 851 depicts a user interface element 850 embodied as a video component with a play button and volume control. According to various embodiments, user interface elements 850 may contain video or audio components, in some instances in combination with other interface element technology (e.g. graphical user interface widgets or controls, textual information, and so forth). Audio user interface element 852 shows another user interface element 850 embodied as an audio component. Textual user interface element 853 illustrates a third user interface element 850 embodied as an information balloon containing a written message.

Figure 9:
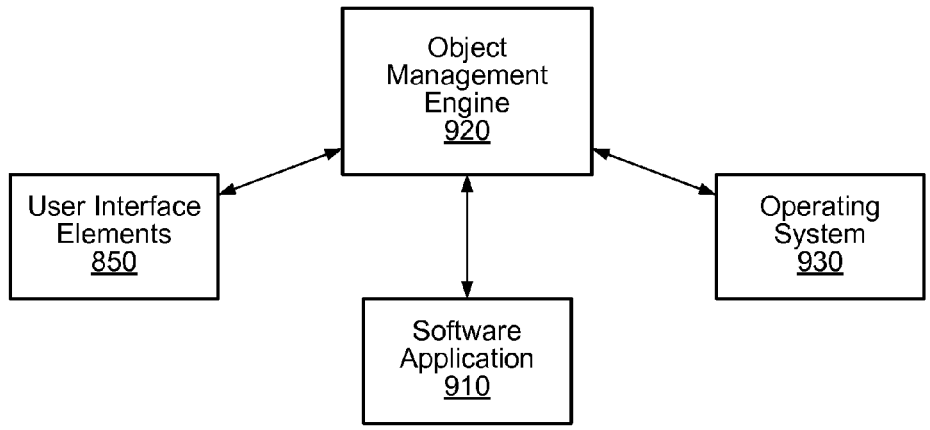
FIG. 9 is a block diagram illustrating one embodiment of a software architecture that may be configured to implement various features of the systems illustrated in FIGS. 8a-8c.

FIG. 9 illustrates one embodiment of a software architecture that may be configured to implement various features of the systems shown in the earlier illustrations. Object management engine 920 may be embodied as a software program configured to manage relationships between user interface elements 850 and physical object 820, and to arbitrate transactions among user interface elements 850, software application 910, and operating system 930. In the illustrated embodiment, user interface elements 850, software application 910, and operating system 930 are configured to interact with object management engine 920. It is noted that in various embodiments, the elements of FIG. 9 may be implemented within a single system, such as surface computing device 200, or may be distributed among several distinct computer systems. For example, software application 910 may be executable by one computer system, such as a server networked to surface computing device 200, while object management engine 920 may be executable by a different system or device, such as surface computing device 200. It is contemplated that in various embodiments, the features of object management engine 920 may be implemented by surface computing device 200, systems or devices distinct from surface computing device 200, or any combination of these.

Object management engine 920 may perform several functions in the service of correlating physical object 820 and software application 910, and of generating, managing, and displaying on interactive display surface 810 a user interface for software application 910, such that the user interface's elements 850 are visually associated on the display surface with corresponding encoded data 830 located on the physical object. Object management engine 920 may be configured to gather and interpret data from physical object 820. In one embodiment, object management engine 920 may facilitate the reading of identifying data on physical object 820, and the subsequent recognition of physical object 820. In various embodiments, object management engine 920 may enable the reading of encoded data 830 on physical object 820, and the subsequent correlation between encoded data 830 and software application 910. In some embodiments object management engine 920 may implement a coordinate system or other suitable system of reference. The coordinate or reference system may be used to construct a geometric or spatial relationship linking a particular locus of encoded data 830 on physical object 820 to a user interface element 850 appearing on interactive display surface 810 in visual association with that encoded data 830.

In one embodiment, object management engine 920 may also be configured to maintain a mapping showing the spatial relationship between physical object 820 and interactive display surface 810. For example, such a mapping may reflect the position of physical object 820 relative to interactive display surface 810. Such mappings may be used in some embodiments to allow interface elements 850 to track physical object 820 if it moves on interactive display surface 810. Such mappings may also play a role in positioning interface elements 850 on interactive display surface 810 relative to physical object 820. Object management engine 920 may be configured to provide, distribute, or convey data indicative of various types of mappings, such as geometric and/or positional mappings or other suitable mappings, amongst assorted elements of the system, including operating system 930, user interface elements 850, software applications 910, miscellaneous device drivers, and other participating software entities.

In some embodiments, object management engine 920 may facilitate the recognition of physical objects placed on interactive display surface 810 by reading identifying data 840. For example, object management engine 920 may be configured to manage optical character recognition (OCR) functions in some embodiments, which may facilitate the transformation of an image of a character represented by identifying data 840 on physical object 820 (e.g. of bits representing pixel data) into an indication of the character itself, such as an ASCII code or other uniform representation of the character. In another embodiment, object management engine 920 may be configured to manage bar code recognition functions, including optical scanning of the code, and relaying the image to a pattern recognition application. Object management engine 920 may exchange data related to the recognition process with a search engine for a database repository of object identity characteristics. In some instances, object management engine 920 may exchange data related to the recognition process with operating system 930, or with a suitable application. It is noted that in some embodiments, physical object 820 may not possess identifying data 840 separate from encoded data 830. In such instances, object management engine 830 may be configured to manage the reading and interpretation of encoded data 830 in order to identify physical object 820. In some embodiments, the engine 920 may be configured to implement any or all of the identification functions itself.

Object management engine 920 may facilitate the reading of encoded data 830 of physical object 820. For example, object management engine 920 may be configured to manage optical scanning and pattern recognition functions in some embodiments, which may enable the capture, transmission, and recognition of imagery of encoded data 830. Object management engine 920 may be capable of itself interpreting imagery of encoded data 830, or it may exchange imagery data with operating system 930, or with an application suitable to interpret the imagery data. Object management engine 920 may also communicate with a separate computing device, such as a search engine for a database repository, in order to interpret encoded data 830. For instance, for an embodiment of physical object 820 as an archaeological relic like a symbol-bearing stone, as described earlier, object management engine 920 may transmit imagery data to an application designed to classify such relics. After categorizing the relic according to imagery information obtained from encoded data 830, the application may relay data to object management engine 920, including information related to encoded data 830 and to a software application 910 for reading symbols on the relic, or for assisting in reassembling fragments of such relics.

In general, object management engine 920 may communicate with applications on surface computing device 200, or with operating system 930, or with a separate computing device networked with surface computing device 200, in order to identify one or more applications capable of interacting with encoded data 830 or with a physical object 820 bearing such data.

Object management engine 920 may also be configured to generate appropriate user interface elements 850 to facilitate a user interface between software application 910 and encoded data 830. In response to receiving information derived from encoded data 830, software application 910 may request the generation of user interface elements 850 corresponding to portions of encoded data 830. Object management engine 920 may then construct the necessary user interface elements 850, using mappings and coordinates described earlier to position each interface element 850 properly with respect to its corresponding locus of encoded data 830 on physical object 820. Additionally, object management engine 920 may generate visual indicators to show the user which area of encoded data 830 is associated with which interface element 850. For example, object management engine 920 provide lines connecting a portion of encoded data 830 with an interface element 850 on interactive display surface 810.

User interface elements 850 may be fashioned to receive input from the user, or from software application 910. They may also visually display or audibly indicate information related to either type of input. User interface elements 850 may be further configured to exchange data between the user and software application 910. Object management engine 920 may be configured to coordinate some or all such activities of user interface element 850. For example, regarding the stone relic embodiment described earlier, software application 910 may request that an interface element 850 be displayed to request that the user rotate or shift two fragments lying on interactive display surface 810. Having devised the appropriate interface element 850, object management engine 920 may cause it to appear on interactive surface 810. In response to the user's moving the fragments, object management engine 920 may ascertain their new orientation with respect to interactive surface 810, and transmit the updated positioning data to software application 910.

In the exemplary tax form embodiment, software application 910 may request that an interface element 850 be displayed, to highlight an interest income field on a tax form, and to request the user to enter data for that field using interface element 850. Object management engine 920 may generate that element and cause it to appear on interactive surface 810. The user may then enter some digits using a touchpad displayed on interactive surface 810 alongside interface element 850. Capacitive sensors or other input detectors in interactive surface 810 may register the user's entry, which may be transmitted by a device driver to object management engine 920. In turn, object management engine 920 may relay the data to software application 910, which may record the data entered by the user and may ask object management engine 920 to deliver an acknowledgment via a user interface element 850.

In general, object management engine 920 may be configured to facilitate and manage the reading of identifying data 840 and of encoded data 830, as well as the generation of user interface elements 850. Object management engine 920 may also be configured to manage and arbitrate transactions involving user interface elements 850. For example, it may interact with devices and device drivers (e.g. cameras or sensors) to gather user input and stimulus, such as gesturing, touch, audio command input, and device input via keyboard, mouse, laser pointer, or other devices mediating input to surface computing device 200. It may also transmit such gathered input data to devices, or to software applications 910. Correspondingly, it may alter, replace, or otherwise change the state of user interface elements 850 in response to ongoing requests by software applications 910.

In some embodiments, object management engine 920 may be configured to interact with various devices of surface computing device 200 via device drivers, or other system services, that may be provided by operating system 930. For example, operating system 930 may correspond to a suitable version of an operating system such as Microsoft Windows™, Apple MacOS™, Linux™, Unix™, or any other suitable operating system, and may be configured to implement native or third-party device support for various ones of the devices. In other embodiments, object management engine 920 may be configured to provide its own software driver or other interface support for interaction with the devices independently of operating system 930. Object management engine 920 may, in various embodiments, be configured to manage communication among or between devices, applications, user interface elements 850, operating systems, and other entities involved in processing data from physical object 820 or in providing and managing user interface elements 850 associated with encoded data 830.

According to various embodiments, object management engine 920 may provide a standard library of user interface elements for applications, and it may also furnish a programming interface for incorporating such library components into various applications. In other embodiments, an application may provide its own interface whose elements are deployable by object management engine 920 in the object-centric fashion described above, such that those elements may be displayed on interactive surface 810 in visual association with portions of encoded data 830. In general, according to the embodiments, object management engine 920 may be configured to manage the generation and deployment of user interface elements 850. In certain embodiments, the elements may be customized by object management engine 920. In other embodiments, they may be strictly rendered on interactive display surface 810 in accordance with specific application requirements. The degree of autonomy exercised by object management engine 920 may vary in harmony with the embodiments. In some instances, an application 910 may rely on the standard user interface library managed by object management engine 920, and may leave decisions regarding the appearance (e.g. placement, coloring, or other characteristics), structure (e.g. design using text, interactive widgets, auditory constituents, or other components), and functioning of user interface elements 850 to the discretion of object management engine 920. In other instances, an application 910 may provide its own set of user interface elements 850, and dictate some or all decisions regarding appearance, structure, and functioning of the elements to object management engine 920.

According to various embodiments, there may be several concurrently running software applications 910, each requiring user interface services from object management engine 920. In various such embodiments, object management engine 920 may coordinate the actions of the user interface elements 850 operating on behalf of their respective software applications 910.

It is noted that the software architecture illustrated in FIG. 9 is merely exemplary, and that other configurations are possible. For example, in various embodiments, the functionality of object management engine 920 may be implemented wholly or partially within another element such as application 910 or operating system 930, or may be distributed among a number of modules or components.

Figure 10:
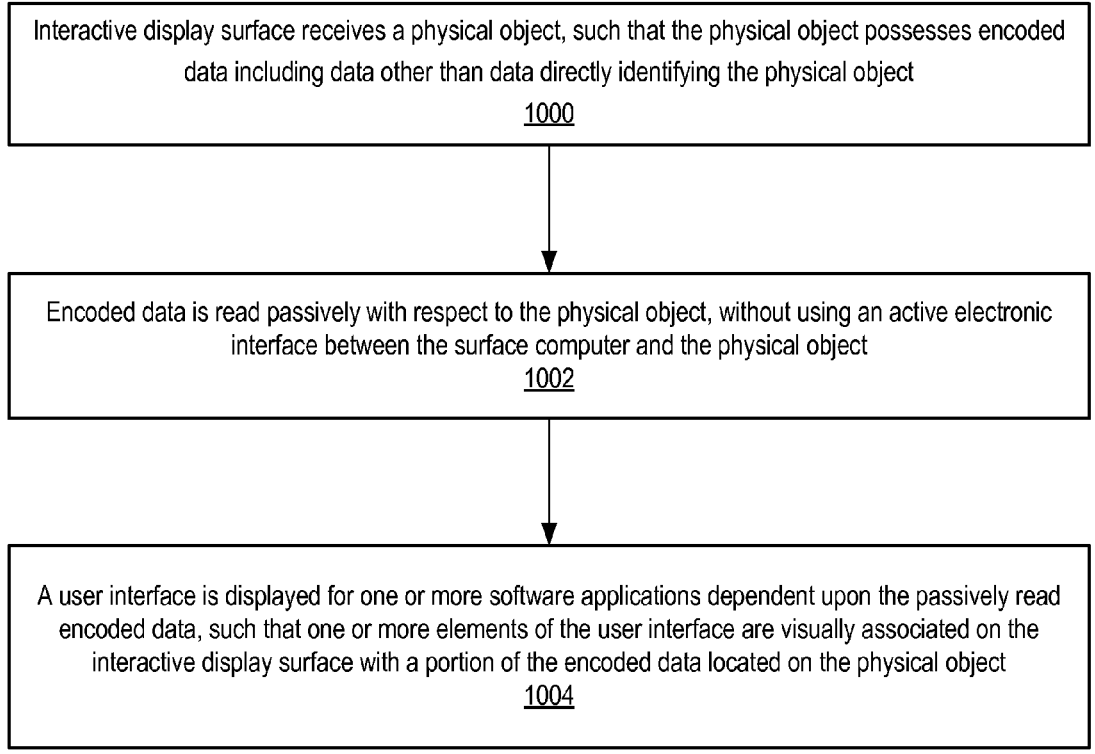
FIG. 10 is a flow diagram illustrating one embodiment of a method for interfacing with objects using a surface computer.

One embodiment of the method of operation of surface computing device 200 is shown in FIG. 10. In the illustrated embodiment, operation begins in block 1000 where interactive display surface 810 receives a physical object 820, such that physical object 820 possesses encoded data 830, including data other than data directly identifying physical object 820. For example, as described above with respect to FIG. 8*a*, a user may place physical object 820 on an interactive display surface 810.

Encoded data 830 is read passively with respect to physical object 820, without using an active electronic interface between the surface computer 200 and the physical object 820 (block 1002), as described in the narration of FIG. 8*b*. As noted before, physical object 820 may be an IRS Form 1040 showing some user-supplied data, or showing no user-supplied data. In such an embodiment, encoded data 830 may include textual, formatting, and geometrically patterned matter (e.g. grid lines, boundary lines, rectangles, and shaded blocks, triangles, and circles) printed on the form before it is filled out by a user of the form, and it may also include information which a user enters on the form. Various devices may facilitate passively reading such an embodiment of encoded data 830, as, for example, in instances where IRS Form 1040 is read by way of optical scanning and optical character recognition.

A user interface is displayed for one or more software applications 910 dependent upon the passively read encoded data 830, such that one or more elements 850 of the user interface are visually associated on the interactive display surface 810 with a portion of the encoded data 830 located on physical object 820 (block 1004). For example, as observed earlier in connection with FIGS. 8*b*, 8*c*, and 9, and the exemplary tax form embodiment, a user interface element 850 may be embodied as a bubble containing information, where the bubble is associated with a portion of encoded data 830 appearing on the IRS Form 1040. For instance, interactive display surface 810 may illuminate the entry field for block 26 of IRS Form 1040 (the one for moving expenses) in yellow light, while displaying a matching yellow information bubble containing related information on interactive display surface 810.

Exemplary Computer System

It is contemplated that in some embodiments, any of the methods, techniques or components described above may be implemented as instructions and data capable of being stored or conveyed via a computer-accessible medium. Such methods or techniques may include, for example and without limitation, the various methods of user interaction with physical documents 130 described above with respect to FIGS. 4-7, as well as the various methods of user interaction with physical objects 820 described above with respect to FIGS. 8-10. In particular, any of application 110, document engine 320, operating system 330, or other suitable combinations or partitions of the functionality of these entities may be implemented as such instructions. Furthermore, any of object management engine 920, user interface elements 850, software application 910, operating system 330, or other suitable combinations or partitions of the functionality of these entities may be implemented as such instructions. Such instructions may be executed to perform a particular computational function, such as generating, sending or, receiving a message, to implement mathematical functions such as integration, differentiation, convolution, etc., as well as to implement higher-order functions such as operating system functionality, network communications functionality, application functionality, and/or any other suitable functions.

Figure 11:
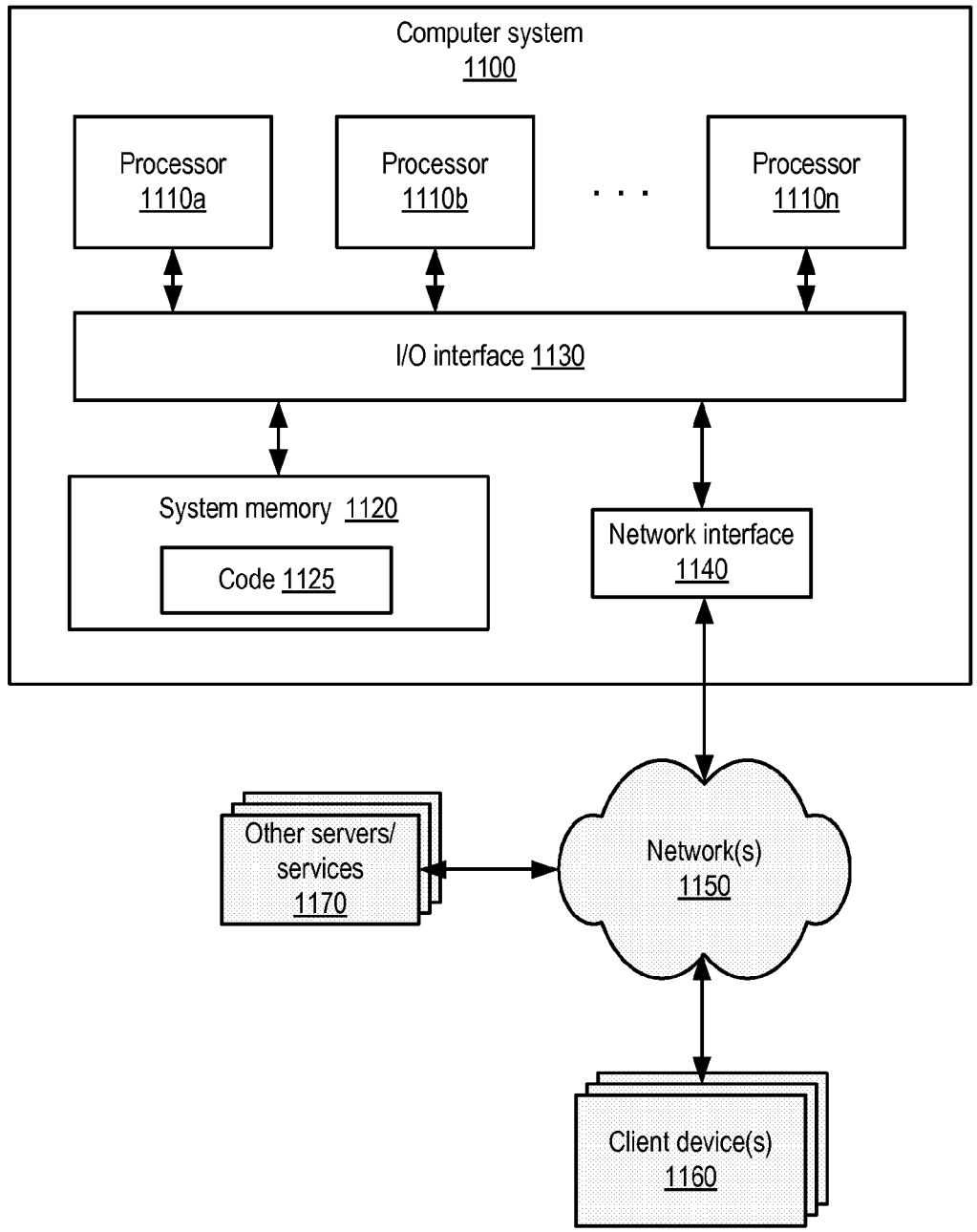
FIG. 11 is a block diagram illustrating an exemplary embodiment of a computer system.

One exemplary embodiment of a computer system including tangible, computer-accessible storage media is illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In different embodiments, system 1100 may be variously configured as a server system, a desktop or notebook system, an embedded system, a handheld or portable client system, etc. In various embodiments, computer system 1100 may be representative of computer system 100 of FIG. 1 or surface computing device 200 of FIG. 2.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 1120 as code 1125. It is noted that in some embodiments, code 1125 may include instructions and data implementing desired functions that are not directly executable by processor 1110 but are represented or encoded in an abstract form that is translatable to instructions that are directly executable by processor 1110. For example, code 1125 may include instructions specified in an ISA that may be emulated by processor 1110, or by other code 1125 executable on processor 1110. Alternatively, code 1125 may include instructions, procedures or statements implemented in an abstract programming language that may be compiled or interpreted in the course of execution. As non-limiting examples, code 1125 may include code specified in a procedural or object-oriented programming language such as C or C++, a scripting language such as perl, a markup language such as HTML or XML, or any other suitable language.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1150, such as other computer systems or communications devices, for example. In particular, network interface 1140 may be configured to allow communication between computer system 1100 and client devices 1160 and/or other servers/services 1170 through various communications channels via network(s) 1150. These client devices 1160 may include various computing and communications devices, which may include elements similar to those of computer system 1100. In particular, client devices 1160 may include devices associated with various ones of other nodes 100, such as personal computers, telephony devices or other network-attached computing devices that users may employ to access network services, such as the message services offered by logical mesh network 10, for example. The communications channels may include, but are not limited to conventional and mobile telephone and text messaging communications channels. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a tangible, computer-accessible storage medium configured to store instructions and data as described above. However, in other embodiments, instructions and/or data may be stored upon and retrieved from different types of computer-accessible storage media. Generally speaking, a computer-accessible medium may include storage media or memory media such as magnetic or optical media, e.g., disk or CD/DVD-ROM coupled to computer system 1100 via I/O interface 1130. A computer-accessible medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. A computer-accessible medium may generally be accessible via transmission media or signals such as electrical, electromagnetic, or digital signals, which may be conveyed via a communication medium such as a network and/or a wireless link, such as may be implemented via network interface 1140.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A surface computer, comprising:
an interactive display surface configured to:
   display visual output,
   detect placement of a physical document on the interactive display surface; and
   optically scan the physical document to obtain encoded data,
   wherein the physical document possesses the encoded data, and
   wherein the encoded data includes data other than data directly identifying the physical document; and
a computer-readable storage medium storing program instructions executable to implement one or more software applications;
   wherein in response to the interactive display surface optically scanning the physical document, the surface computer is configured to:
     determine, based on the encoded data, a document type from a plurality of document types; and
     based on the encoded data and the document type, identify, from a plurality of software applications, a software application capable of functioning in concert with the encoded data, wherein the software application comprises a plurality of application data items; and
wherein, in response to the identifying, the interactive display surface is further configured to:
   display a user interface for the software application;
   receive user input via a portion of the physical document;
   visibly distinguish, based on the user input and software application, the portion of the physical document at a position physically matching the portion of the physical document that received the user input;
   select a first application data item of the plurality of application data items based on a relationship between the first application data item and the portion of the physical document; and
   display the first application data item.

2. The surface computer as recited in claim 1, wherein optically scanning the physical document to obtain the encoded data comprises scanning optically data from one or more surfaces of the physical document.

3. The surface computer as recited in claim 1, wherein the physical document is a tax form, and wherein the encoded data comprises one selected from a group consisting of a geometric pattern of the tax form and a print pattern of the tax form.

4. The surface computer as recited in claim 1, wherein the physical document further possesses identifying data distinct from the encoded data.

5. The surface computer as recited in claim 1, wherein in response to the user input, the interactive display surface is further configured to display the user interface in a changed state, wherein one or more elements of the user interface in the changed state are dynamically generated in response to the user input.

6. The surface computer as recited in claim 5, wherein the user input comprises tactile input received via the interactive display surface.

7. The surface computer as recited in claim 1, wherein the physical document comprises a surface including a plurality of document data items.

8. The surface computer as recited in claim 7, wherein at least some of the document data items are human-readable.

9. The surface computer as recited in claim 7, wherein the user interface is configured to display a plurality of selectable application data items corresponding to the software application, and wherein, in response to a user's selection of an application data item via the user interface, the interactive display surface is configured to visibly indicate a location on the surface of the physical document that includes a document data item corresponding to the application data item selected via the user interface.

10. The surface computer as recited in claim 7, wherein in response to a user selecting a particular area of the surface of the physical document, the interactive display surface is further configured to indicate to the user one or more particular application data items corresponding to the particular area of the surface of the physical document.

11. The surface computer as recited in claim 1, wherein the user interface is further displayed such that one or more elements of the user interface are visually associated with a portion of the encoded data located on the physical document.

12. The surface computer as recited in claim 1, wherein the interactive display surface is further configured to receive a plurality of physical documents including said physical document, and wherein at least one element of the user interface displayed by the interactive display surface is generated dependent upon a context, when the context includes one or more of a currently active application or one or more additional physical documents received by the interactive display surface.

13. A method, comprising:
   detecting, by an interactive display surface, placement of a physical document on the interactive display surface;
   optically scanning, by the interactive display surface, the physical document to obtain encoded data,
       wherein the physical document possesses encoded data, and
       wherein the encoded data includes data other than data directly identifying the physical document;
   in response to the interactive display surface optically scanning the physical document:
       determining, based on the encoded data, a document type from a plurality of document types; and
       based on the encoded data and the document type, identifying, from a plurality of software applications, a software application capable of functioning in concert with the encoded data, wherein the software application comprises a plurality of application data items;
   in response to the identifying:
       displaying, by the interactive display surface, a user interface for the software application;
       receiving user input via a portion of the physical document;
       visibly distinguishing, based on the user input and software application, the portion of the physical document at a position physically matching the portion of the physical document that received the user input; and
       selecting a first application data item of the plurality of application data items based on a relationship between the first application data item and the portion of the physical document; and
       displaying the first application data item.

14. The method as recited in claim 13, wherein optically scanning the physical document to obtain the encoded data comprises scanning optically data from one or more surfaces of the physical document.

15. The method as recited in claim 13, wherein the physical document is a tax form, and wherein the encoded data comprises one selected from a group consisting of a geometric pattern of the tax form and a print pattern of the tax form.

16. The method as recited in claim 13, wherein the physical document further possesses identifying data distinct from the encoded data.

17. The method as recited in claim 13, further comprising:
   in response to the user input, the interactive display surface displays the user interface in a changed state, wherein one or more elements of the user interface in the changed state are dynamically generated in response to the user input.

18. The method as recited in claim 17, wherein the user input comprises tactile input received via the interactive display surface.

19. The method as recited in claim 13, wherein the physical document comprises a surface including a plurality of document data items.

20. The method as recited in claim 19, wherein at least some of the document data items are human-readable.

21. The method as recited in claim 19, further comprising:
   the interactive display surface displaying, via the user interface, a plurality of selectable application data items corresponding to the software application; and
   in response to a user's selection of an application data item via the user interface, the interactive display surface visibly indicates a location on the surface of the physical document that includes a document data item corresponding to the application data item selected via the user interface.

22. The method as recited in claim 19, further comprising:
   in response to a user selecting a particular area of the surface of the physical document, the interactive display surface indicating to the user one or more particular application data items corresponding to the particular area of the surface of the physical document.

23. The method as recited in claim 13, further comprising the interactive display surface displaying the user interface such that one or more elements of the user interface are visually associated with a portion of the encoded data located on the physical document.

24. The method as recited in claim 13, further comprising:
   generating an element of the user interface displayed by the interactive display surface based on a context, when the context includes one or more of a currently active application or one or more additional physical documents received by the interactive display surface.

25. A non-transitory computer-readable storage medium storing program instructions, wherein the program instructions are computer-executable to:
   detect, by an interactive display surface, placement of a physical document on the interactive display surface;
   optically scan, by the interactive display surface, the physical document to obtain encoded data,
       wherein the physical document possesses encoded data, and
       wherein the encoded data includes data other than data directly identifying the physical document;
   in response to detecting the interactive display surface optically scanning the physical document:
       determine, based on the encoded data, a document type from a plurality of document types; and
       based on the encoded data and the document type, identify, from a plurality of software applications, a software application capable of functioning in concert with the encoded data, wherein the software application comprises a plurality of application data items; and in response to the identifying:
- display, by the interactive display surface, a user interface for the software application;
- receive user input via a portion of the physical document;
- visibly distinguish, based on the user input and software application, the portion of the physical document at a position physically matching the portion of the physical document that received the user input; and
- select a first application data item of the plurality of application data items based on a relationship between the first application data item and the portion of the physical document; and
- display the first application data item.

26. The non-transitory computer-readable storage medium as recited in claim 25, wherein optically scanning the physical document to obtain the encoded data, the program instructions are further computer-executable to optically scan data from one or more surfaces of the physical document.

27. The non-transitory computer-readable storage medium as recited in claim 25, wherein the physical document is a tax form, and wherein the encoded data comprises one selected from a group consisting of a geometric pattern of the tax form and a print pattern of the tax form.

28. The non-transitory computer-readable storage medium as recited in claim 25, wherein the physical document further possesses identifying data distinct from the encoded data.

29. The non-transitory computer-readable storage medium as recited in claim 25, wherein the program instructions are further computer-executable to:
- in response to detecting the user input, dynamically generate one or more elements corresponding to a changed state of the user interface, and display the user interface in the changed state via the interactive display surface.

30. The non-transitory computer-readable storage medium as recited in claim 29, wherein the user input comprises tactile input received via the interactive display surface.

31. The non-transitory computer-readable storage medium as recited in claim 25, wherein the physical document comprises a surface including a plurality of document data items.

32. The non-transitory computer-readable storage medium as recited in claim 31, wherein at least some of the document data items are human-readable.

33. The non-transitory computer-readable storage medium as recited in claim 31, wherein the program instructions are further computer-executable to:
- display, via the user interface and the interactive display surface, a plurality of selectable application data items corresponding to the software application; and
- in response to detecting a user's selection of an application data item via the user interface, visibly indicate, via the interactive display surface, a location on the surface of the physical document that includes a document data item corresponding to the application data item selected via the user interface.

34. The non-transitory computer-readable storage medium as recited in claim 31, wherein the program instructions are further computer-executable to:
- in response to detecting a user selecting a particular area of the surface of the physical document, indicate to the user via the interactive display surface one or more particular application data items corresponding to the particular area of the surface of the physical document.

35. The non-transitory computer-readable storage medium as recited in claim 25, wherein the instructions are further computer-executable to display the user interface such that the one or more elements of the user interface are visually associated with a portion of the encoded data located on the physical document.

36. The non-transitory computer-readable storage medium as recited in claim 25, wherein the instructions are further computer-executable to:
- generate an element of the user interface displayed by the interactive display surface dependent upon a context, when the context includes one or more of a currently active application or one or more additional physical documents received by the interactive display surface.

* * * * *